United States Patent
Matsumoto et al.

(10) Patent No.: US 10,890,530 B2
(45) Date of Patent: Jan. 12, 2021

(54) IMAGE ACQUISITION DEVICE AND IMAGE ACQUISITION METHOD

(71) Applicants: NATIONAL UNIVERSITY CORPORATION HAMAMATSU UNIVERSITY SCHOOL OF MEDICINE, Hamamatsu (JP); HAMAMATSU PHOTONICS K.K., Hamamatsu (JP)

(72) Inventors: Naoya Matsumoto, Hamamatsu (JP); Shigetoshi Okazaki, Hamamatsu (JP)

(73) Assignees: NATIONAL UNIVERSITY CORPORATION HAMAMATSU UNIVERSITY SCHOOL OF MEDICINE, Hamamatsu (JP); HAMAMATSU PHOTONICS K.K., Hamamatsu (JP)

( * ) Notice: Subject to any disclaimer, the term of this patent is extended or adjusted under 35 U.S.C. 154(b) by 300 days.

(21) Appl. No.: 16/089,394

(22) PCT Filed: Mar. 8, 2017

(86) PCT No.: PCT/JP2017/009269
§ 371 (c)(1),
(2) Date: Sep. 28, 2018

(87) PCT Pub. No.: WO2017/169597
PCT Pub. Date: Oct. 5, 2017

(65) Prior Publication Data
US 2020/0300762 A1 Sep. 24, 2020

(30) Foreign Application Priority Data
Apr. 1, 2016 (JP) .................................. 2016-074204

(51) Int. Cl.
*G02B 27/00* (2006.01)
*G02B 21/00* (2006.01)
(Continued)

(52) U.S. Cl.
CPC ..... *G01N 21/6456* (2013.01); *G02B 21/0032* (2013.01); *G02B 21/0076* (2013.01);
(Continued)

(58) Field of Classification Search
CPC ....... G01N 21/6456; G01N 2021/6463; G01N 2201/0675; G01N 2201/121;
(Continued)

(56) References Cited

U.S. PATENT DOCUMENTS 9,433,350 B2\* 9/2016 Schonborn ........... G02B 21/365
2004/0213463 A1\* 10/2004 Morrison ............... G01B 11/25
382/210

(Continued)

FOREIGN PATENT DOCUMENTS

CN 1482570 A 4/2004
CN 101019018 A 8/2007
(Continued)

OTHER PUBLICATIONS

Jae Won Cha et al., "Reassignment of Scattered Emission Photons in Multifocal Multiphoton Microscopy," Scientific Reports, 4:5153, 2014, pp. 1-13.
(Continued)

*Primary Examiner* — Taeho Jo
(74) *Attorney, Agent, or Firm* — Faegre Drinker Biddle & Reath LLP

(57) ABSTRACT

An image acquisition apparatus includes a spatial light modulator, an optical scanner, a detection unit, a control unit. The spatial light modulator performs focused irradiation on irradiation regions on a surface or inside of an
(Continued)

observation object with modulated excitation light. The detection unit has imaging regions in an imaging relation with the irradiation regions on a light receiving surface, each of the imaging regions corresponds to one or two or more pixels, and a pixel that corresponds to none of the imaging regions exists adjacent to each imaging region. The control unit corrects a detection signal of a pixel corresponding to each imaging region on the basis of a detection signal of the pixel that exists adjacent to the imaging region and corresponds to none of the imaging regions, and generates an image of the observation object on the basis of the corrected detection signal.

22 Claims, 25 Drawing Sheets

(51) Int. Cl.
| | | |
|---|---|---|
| *G02B 21/04* | (2006.01) | |
| *G01N 21/64* | (2006.01) | |
| *G02F 1/01* | (2006.01) | |
| *G02B 21/02* | (2006.01) | |
| *G02B 21/36* | (2006.01) | |

(52) U.S. Cl.
CPC ......... *G02B 21/025* (2013.01); *G02B 21/361* (2013.01); *G01N 2021/6463* (2013.01); *G01N 2201/0675* (2013.01); *G01N 2201/121* (2013.01)

(58) Field of Classification Search
CPC ............ G02B 21/0032; G02B 21/0076; G02B 21/025; G02B 21/361
See application file for complete search history.

(56) References Cited

U.S. PATENT DOCUMENTS

| | | | |
|---|---|---|---|
| 2007/0057211 A1 | 3/2007 | Bahlman et al. | |
| 2010/0296727 A1* | 11/2010 | Stern | G02B 21/16 382/154 |
| 2013/0258146 A1* | 10/2013 | Hunter | H04N 9/07 348/246 |
| 2013/0321674 A1* | 12/2013 | Cote | H04N 5/232933 348/242 |
| 2013/0321677 A1* | 12/2013 | Cote | H04N 5/217 348/243 |
| 2014/0313350 A1* | 10/2014 | Keelan | H04N 9/04555 348/188 |
| 2015/0185523 A1* | 7/2015 | Matsumoto | G02F 1/1313 359/238 |
| 2015/0219937 A1* | 8/2015 | Matsumoto | B23K 26/0622 359/279 |
| 2016/0131883 A1* | 5/2016 | Kleppe | G02B 15/14 348/79 |
| 2016/0330414 A1* | 11/2016 | Takado | H04N 9/045 |

FOREIGN PATENT DOCUMENTS

| | | |
|---|---|---|
| CN | 102348073 A | 2/2012 |
| CN | 102939555 A | 2/2013 |
| CN | 104508462 A | 4/2015 |
| CN | 105026916 A | 11/2015 |
| EP | 2703871 A3 | 3/2014 |
| EP | 2949117 A1 | 12/2015 |
| JP | 2008-49393 A | 3/2008 |
| JP | 2009-130777 A | 6/2009 |
| JP | 2011-128572 A | 6/2011 |
| JP | 2014-006308 A | 3/2014 |
| JP | 2015-1674 A | 1/2015 |

OTHER PUBLICATIONS

Ki Hean Kim et al., "Multifocal multiphoton microscopy based on multianode photomultiplier tubes," Optics Express, Sep. 2007, pp. 11658-11678, vol. 15, No. 18.

International Preliminary Report on Patentability dated Oct. 11, 2018 for PCT/JP2017/009269.

* cited by examiner

*Fig.3*
(a)
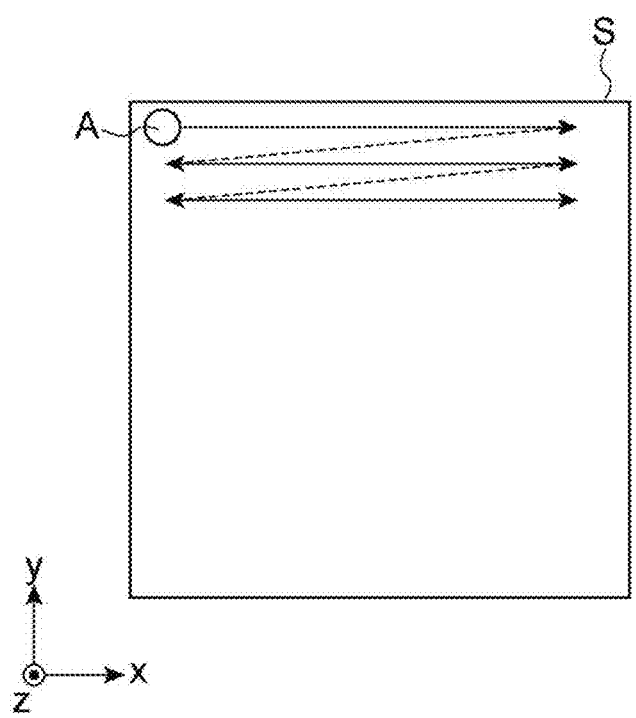
(b)
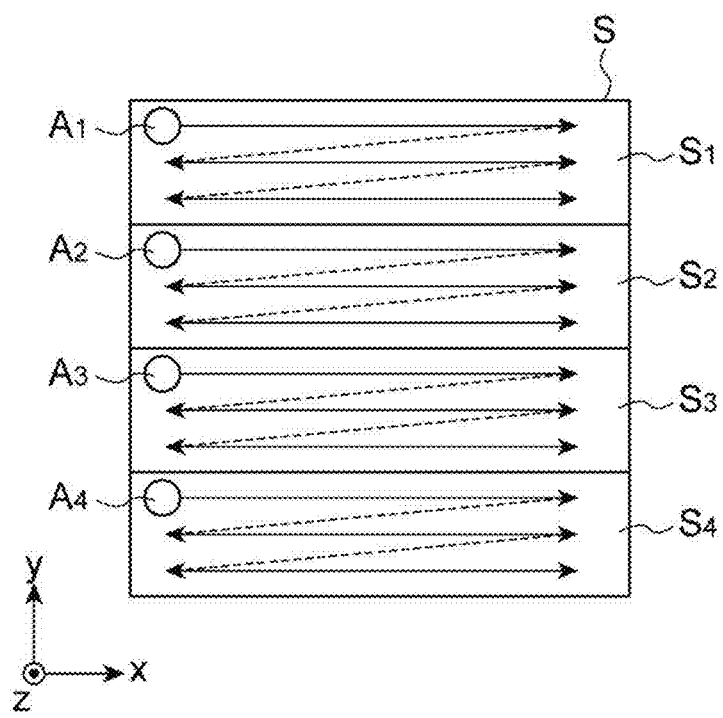

*Fig.4*
(a)
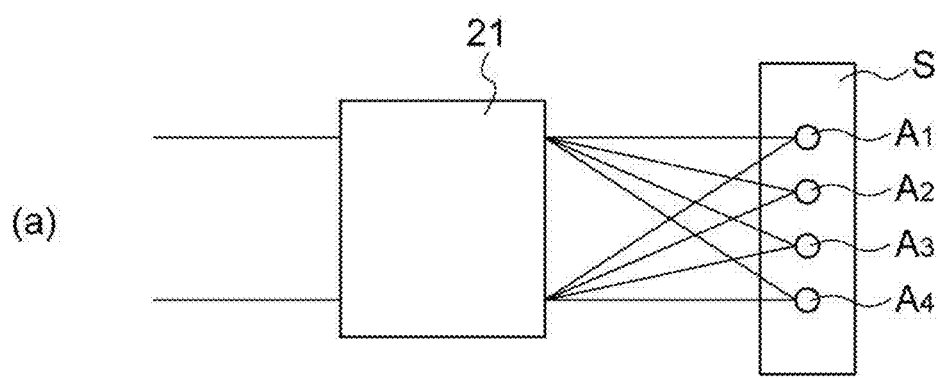
(b)
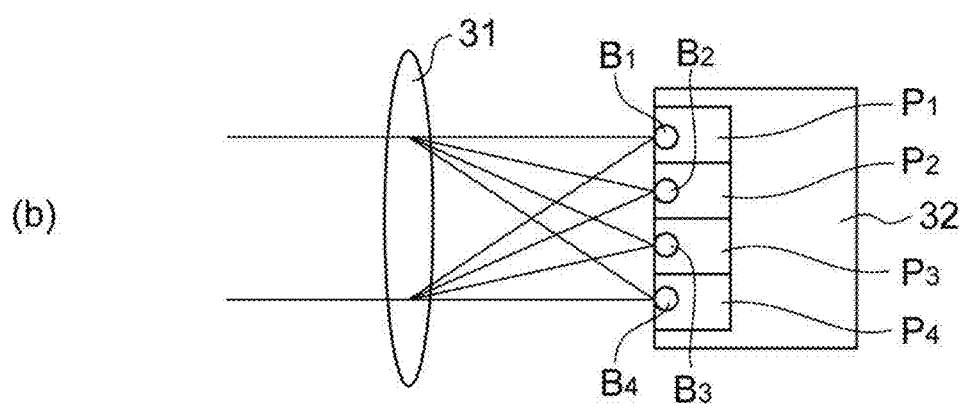

*Fig.9*
(a)
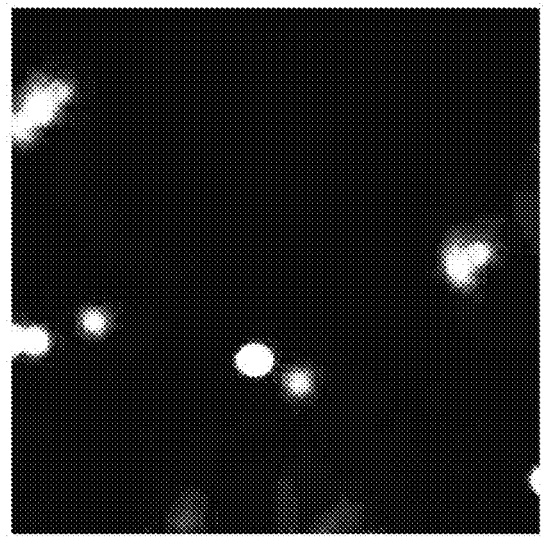
(b)
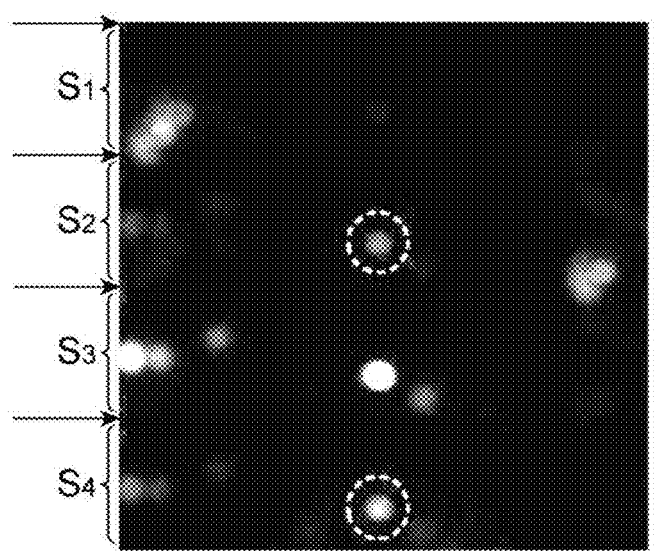

Fig.10
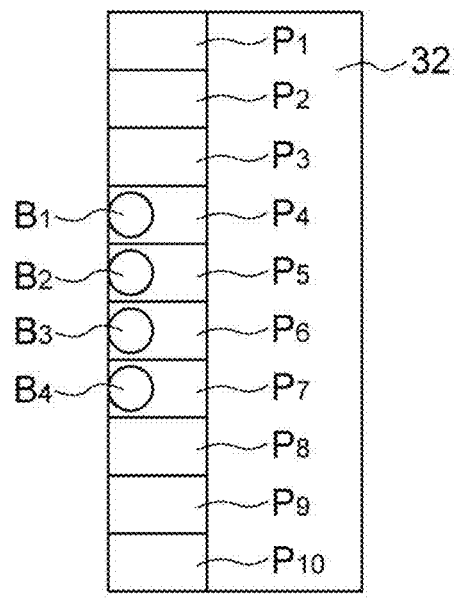
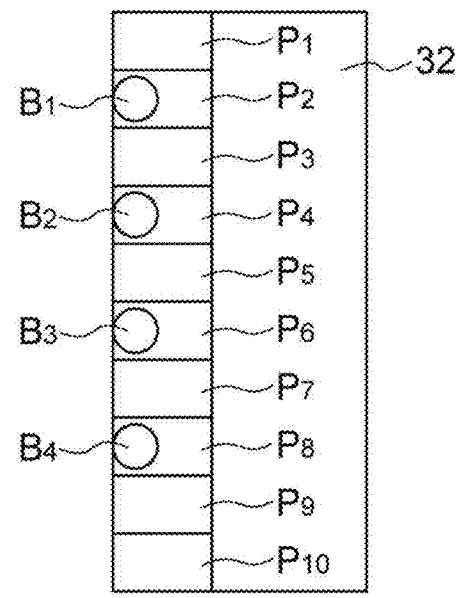
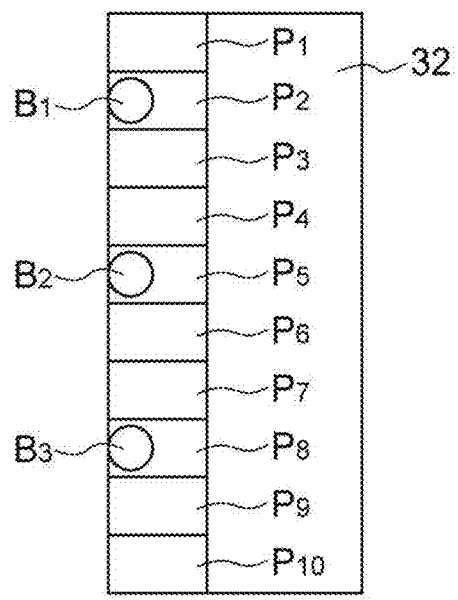
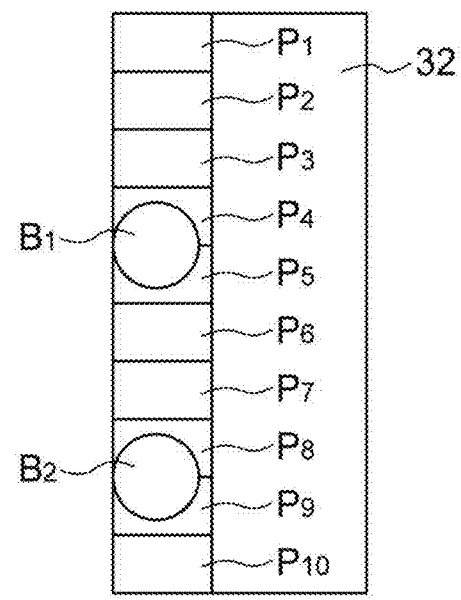

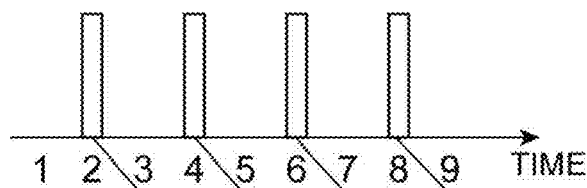
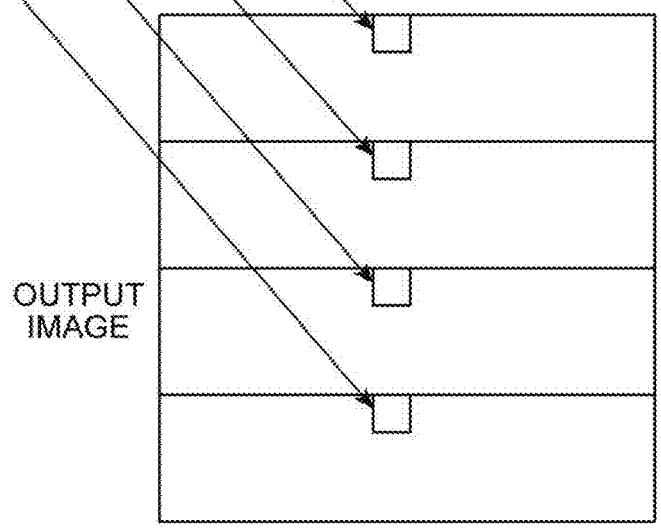

Fig.12
(a)
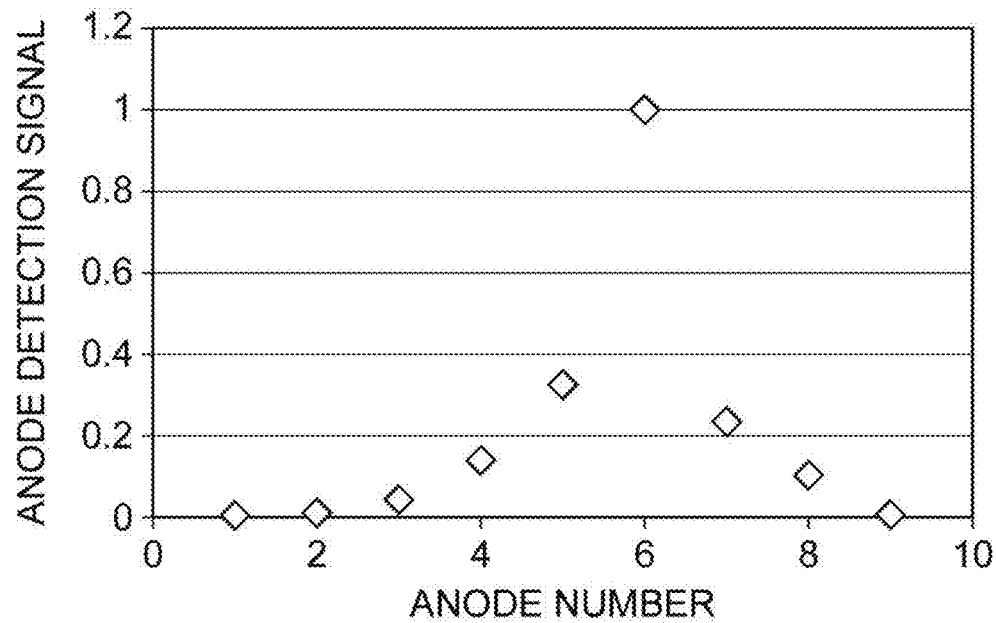
(b)
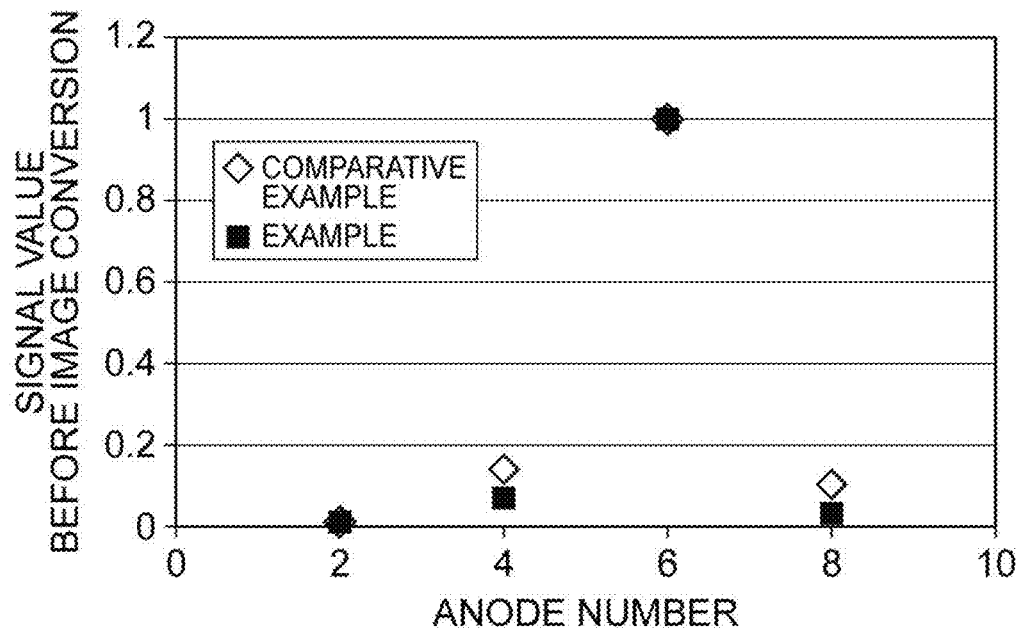

Fig.13
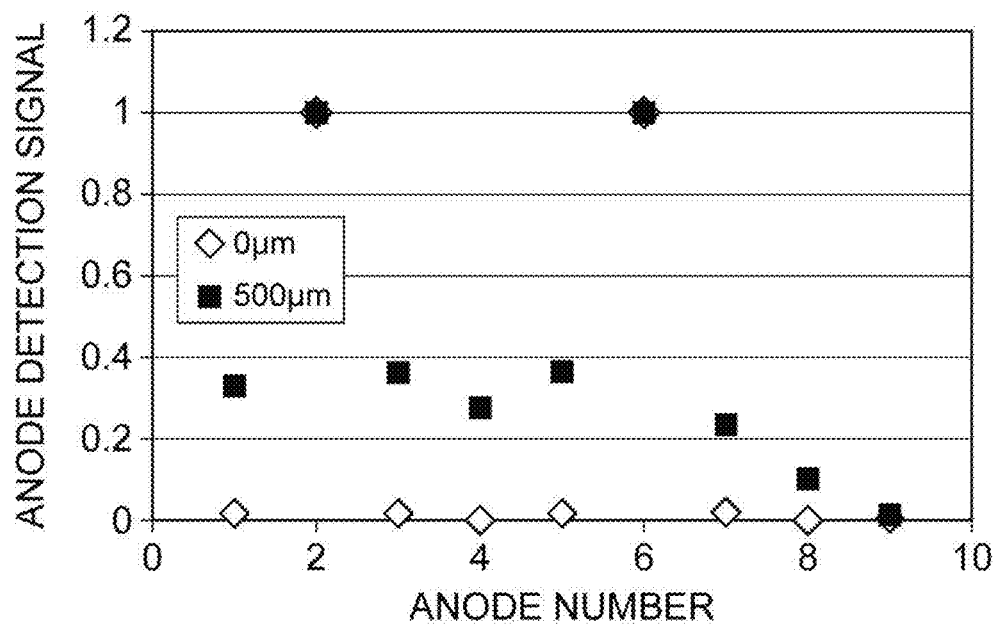
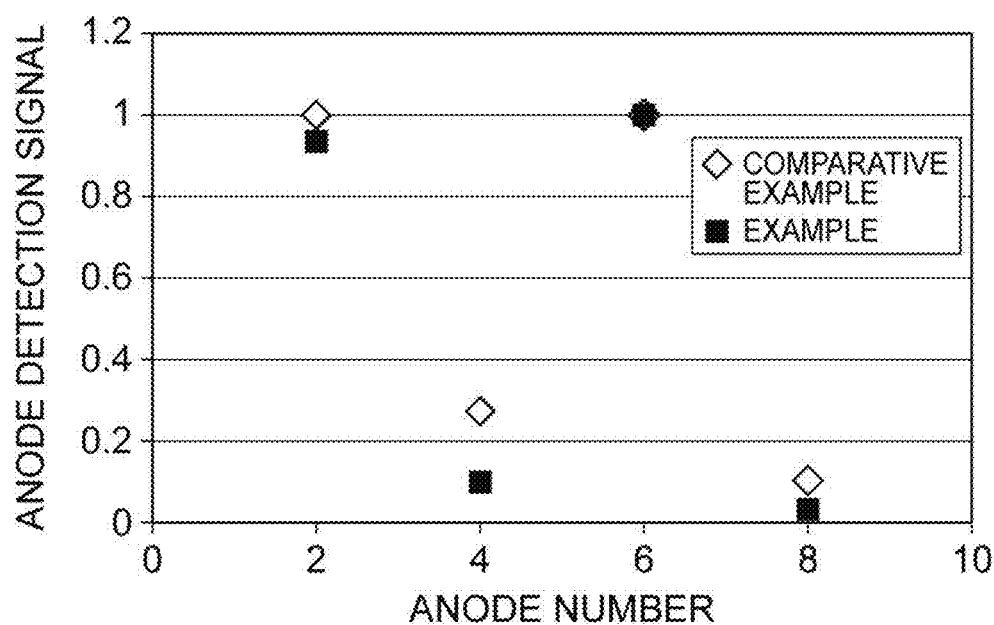

Fig.14
(a)
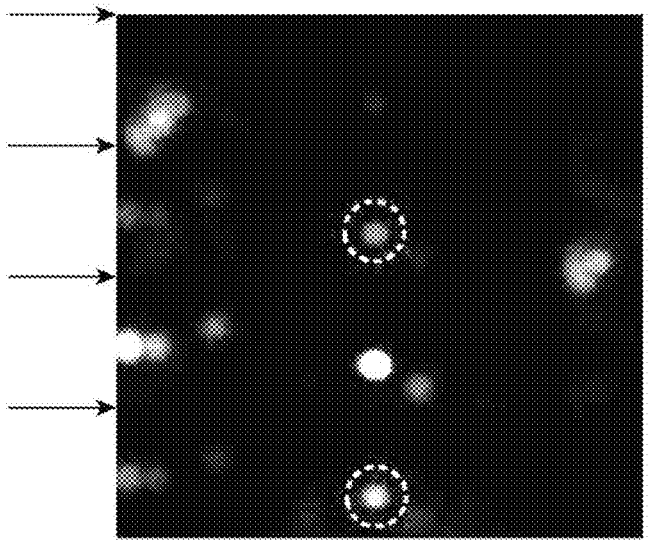
(b)
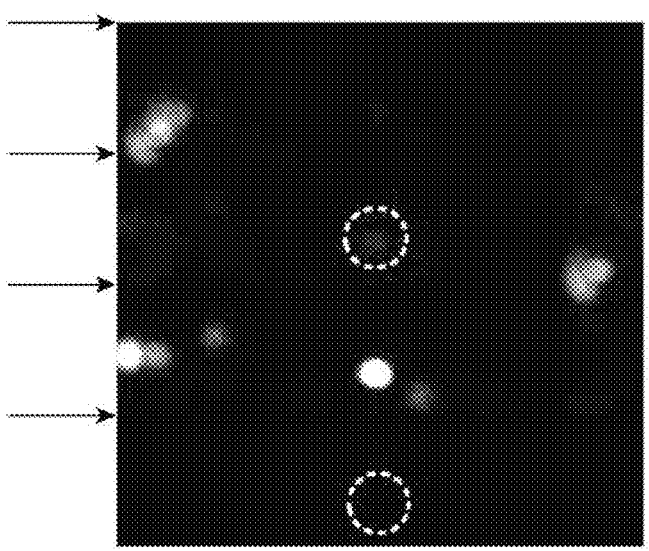

Fig.25
(a)
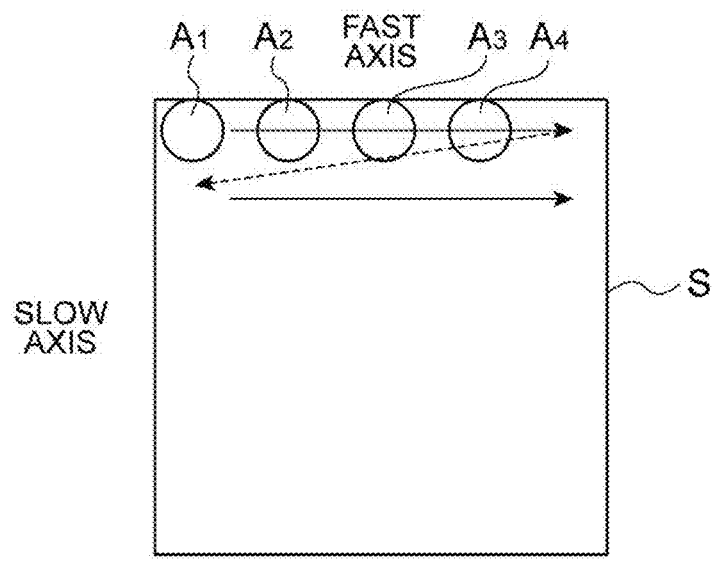
(b)
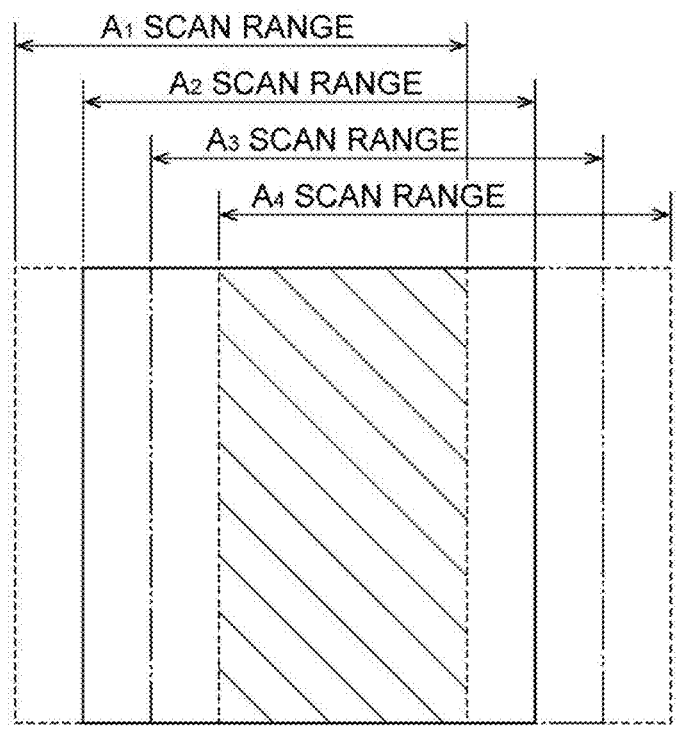

IMAGE ACQUISITION DEVICE AND IMAGE ACQUISITION METHOD

TECHNICAL FIELD

An aspect of the present invention relates to an apparatus and a method for performing focused irradiation on a plurality of irradiation regions on a surface or inside of an observation object with light, scanning the plurality of irradiation regions, detecting light generated in each of the plurality of irradiation regions, and generating an image of the observation object.

BACKGROUND ART

An image acquisition apparatus described in each of Non Patent Documents 1 and 2 can perform focused irradiation on a plurality of irradiation regions on a surface or inside of an observation object with light, scan the plurality of irradiation regions, detect light (for example, fluorescence, harmonic light, reflected scattered light, or the like) generated in each of the plurality of irradiation regions, and generate an image of the observation object. As compared with the case of scanning a single irradiation region with a single irradiation light beam (hereinafter, referred to as "single-point scanning"), in the case of simultaneously scanning N irradiation regions with N irradiation light beams (hereinafter, referred to as "multi-point scanning" or "N-point scanning"), because a size of a scan range of each irradiation region can be reduced to 1/N, a measurement time required for collecting data for generating the image of the observation object can be shortened to 1/N. Here, N is an integer of 2 or more.

An xyz orthogonal coordinate system in which a direction of light irradiation on the observation object is set to a z direction is assumed. In the case of acquiring an image of an xy plane at a certain point in the z direction, for example, if a time required for the single-point scanning is 0.24 seconds, a time required for four-point scanning may be 0.06 seconds. Further, in the case of acquiring an image of the xy plane at each of 1000 points in the z direction (that is, in the case of acquiring a three-dimensional image), the time required for the single-point scanning is 240 seconds, and the time required for the four-point scanning is 60 seconds. As such, as compared with the single-point scanning, in the multi-point scanning, it is possible to collect data in a short time and generate an image of the observation object.

Further, if the same time as the time required for the single-point scanning can be used in the N-point scanning, a time (exposure time) for receiving light generated in each irradiation region can be increased by N times, and a light irradiation amount on the observation object can be reduced. This leads to reduction of damage to the observation object or fluorescent molecules, and further, is effective for performing repeated measurements such as time lapse.

In the case of the multi-point scanning, it is necessary to use a detection unit to individually detect light generated in each of the plurality of irradiation regions. That is, the light generated in each irradiation region of the observation object is imaged on a corresponding imaging region on a light receiving surface of the detection unit, and a detection signal is extracted individually from each imaging region. A plurality of imaging regions on the light receiving surface of the detection unit are separated from each other, as with the plurality of irradiation regions in the observation object separated from each other.

Light generated in a certain irradiation region in the observation object should be received by the imaging region corresponding to the irradiation region on the light receiving surface of the detection unit, however, a part of the light may be received as noise light by other imaging regions, due to an influence of scattering and aberration inside the observation object. The noise light becomes background noise in the image of the observation object to be generated, or generates a ghost image at a position different from a position of an original image in the image, thereby reducing a signal-to-noise (SN) ratio. If the irradiation region in the observation object becomes deep from a surface, such phenomenon becomes remarkable.

Non Patent Documents 1 and 2 describe techniques for improving the SN ratio of the image of the observation object. The SN ratio improvement technique described in Non Patent Document 1 is intended to perform the single-point scanning on an observation object having a single fluorescence generation region to obtain the spread of light on the light receiving surface of the detection unit, and calculate deconvolution of an image of the observation object acquired by the multi-point scanning and the spread of the light, thereby improving the SN ratio of the image of the observation object. The SN ratio improvement technique described in Non Patent Document 2 is intended to perform an estimation by a maximum likelihood estimation method on the basis of the image of the observation object acquired by the multi-point scanning, and obtain the image of the observation object with the improved SN ratio.

CITATION LIST

Non Patent Literature

Non Patent Document 1: K. H. Kim et al., "Multifocal multiphoton microscopy based on multianode photomultiplier tubes", Optics Express, Vol. 15, No. 18, pp. 11658-11678 (2007)

Non Patent Document 2: J. W. Cha et al., "Reassignment of Scattered Emission Photons in Multifocal Multiphoton Microscopy", Scientific Reports 4:5153 pp. 1-13 (2014)

SUMMARY OF INVENTION

Technical Problem

In the SN ratio improvement technique described in Non Patent Document 1, it is necessary to perform the single-point scanning to obtain the spread of light on the light receiving surface of the detection unit. Because the extent of the spread of the light on the light receiving surface of the detection unit differs by the depth (position in the z direction) of the irradiation region in the observation object, it is necessary to set the irradiation region to each position in the z direction and obtain the spread. Although the multi-point scanning aims at shortening the measurement time, it is necessary to perform the single-point scanning in addition to the multi-point scanning, so that the measurement time is lengthened contrary to the purpose. Originally, if the single-point scanning is performed, it is not necessary to perform the multi-point scanning. In the SN ratio improvement technique described in Non Patent Document 2, it is necessary to repeat calculation when the estimation by the maximum likelihood estimation method is performed, and it takes a long time to repeat the calculation.

An aspect of the present invention has been made in order to solve the above problem, and an object thereof is to provide an image acquisition apparatus and an image acquisition method capable of easily improving an SN ratio of an image of an observation object generated by multi-point scanning.

Solution to Problem

An image acquisition apparatus according to an aspect of the present invention includes (1) a light source for outputting light; (2) an irradiation optical system for performing focused irradiation on a plurality of irradiation regions on a surface or inside of an observation object with the light output from the light source; (3) a scanning unit for scanning the plurality of irradiation regions in a direction intersecting with an optical axis of a direction of light irradiation on the observation object by the irradiation optical system; (4) an imaging optical system for guiding and imaging light generated in each of the plurality of irradiation regions by light irradiation on the observation object by the irradiation optical system; (5) a detection unit having a light receiving surface on which the plurality of irradiation regions are imaged by the imaging optical system, a plurality of pixels being arranged one-dimensionally or two-dimensionally on the light receiving surface, and for outputting a detection signal having a value according to a light receiving amount in each of the plurality of pixels; and (6) an image generation unit for generating an image of the observation object on the basis of the detection signal output from the detection unit.

Further, in the image acquisition apparatus of the above configuration, (a) the detection unit has a plurality of imaging regions in an imaging relation by the imaging optical system with the plurality of irradiation regions in the observation object on the light receiving surface, each of the plurality of imaging regions corresponds to one or two or more pixels, and a pixel that corresponds to none of the plurality of imaging regions exists adjacent to each imaging region, and (b) the image generation unit corrects a detection signal of a pixel corresponding to each of the plurality of imaging regions on the basis of detection signals of one or two or more pixels that exist adjacent to each imaging region and correspond to none of the plurality of imaging regions, and generates an image of the observation object on the basis of the corrected detection signal.

An image acquisition method according to an aspect of the present invention is an image acquisition method using the light source, the irradiation optical system, the scanning unit, the imaging optical system, and the detection unit described above, and for generating an image of the observation object on the basis of the detection signal output from the detection unit, and in the method, (a) a plurality of imaging regions in an imaging relation by the imaging optical system with the plurality of irradiation regions in the observation object are provided on the light receiving surface of the detection unit, each of the plurality of imaging regions corresponds to one or two or more pixels, and a pixel that corresponds to none of the plurality of imaging regions exists adjacent to each imaging region, and (b) a detection signal of a pixel corresponding to each of the plurality of imaging regions is corrected on the basis of detection signals of one or two or more pixels that exist adjacent to each imaging region and correspond to none of the plurality of imaging regions, and an image of the observation object is generated on the basis of the corrected detection signal.

Advantageous Effects of Invention

According to an aspect of the present invention, an SN ratio of an image of an observation object generated by multi-point scanning can be easily improved.

BRIEF DESCRIPTION OF DRAWINGS

FIG. 3 includes diagrams for explaining (a) single-point scanning and (b) multi-point scanning.

FIG. 4 includes diagrams for explaining (a) irradiation regions $A_1$ to $A_4$ in an observation object S and (b) imaging regions $B_1$ to $B_4$ on a light receiving surface of a detection unit 32.

FIG. 9 includes diagrams showing fluorescence images of an observation object in the case of (a) single-point scanning and (b) four-point scanning.

FIG. 10 includes (a)-(d) diagrams for explaining a relation between pixel structures and imaging regions on a light receiving surface of a detection unit 32.

FIG. 11 includes (a), (b) diagrams for explaining a relation between a detection signal output from a detection unit 32 and an image of an observation object S.

FIG. 12 includes (a), (b) graphs showing a result of simulation for confirming an effect of correction of a detection signal.

FIG. 13 includes (a), (b) graphs showing a result of simulation for confirming an effect of correction of a detection signal.

FIG. 14 includes (a), (b) fluorescence images of an observation object showing an effect of SN ratio improvement according to a first example.

FIG. 20 is a diagram for explaining a relation between pixel structures and imaging regions in the case of using a detection unit in which a plurality of pixels are two-dimensionally arranged on a light receiving surface.

FIG. 21 is a diagram for explaining a relation between pixel structures and imaging regions in the case of using a detection unit in which a plurality of pixels are two-dimensionally arranged on a light receiving surface.

FIG. 22 is a diagram for explaining a relation between pixel structures and imaging regions in the case of using a detection unit in which a plurality of pixels are two-dimensionally arranged on a light receiving surface.

FIG. 25 includes (a), (b) diagrams for explaining an another example of multi-point scanning.

DESCRIPTION OF EMBODIMENTS

Hereinafter, embodiments for carrying out the present invention will be described in detail with reference to the accompanying drawings. In the description of the drawings, the same elements will be denoted by the same reference signs, without redundant description. Further, the present invention is not limited to these examples.

An image acquisition apparatus and an image acquisition method according to the present embodiment can acquire an image of fluorescence, harmonic light, reflected scattered light, or the like generated on a surface or inside of an observation object, however, an embodiment in which a fluorescence image of the observation object is acquired is mainly described below. Further, in the respective drawings, an xyz orthogonal coordinate system is shown for the convenience of explaining a relation between the observation object, a light irradiation direction, and the like.

Figure 1:
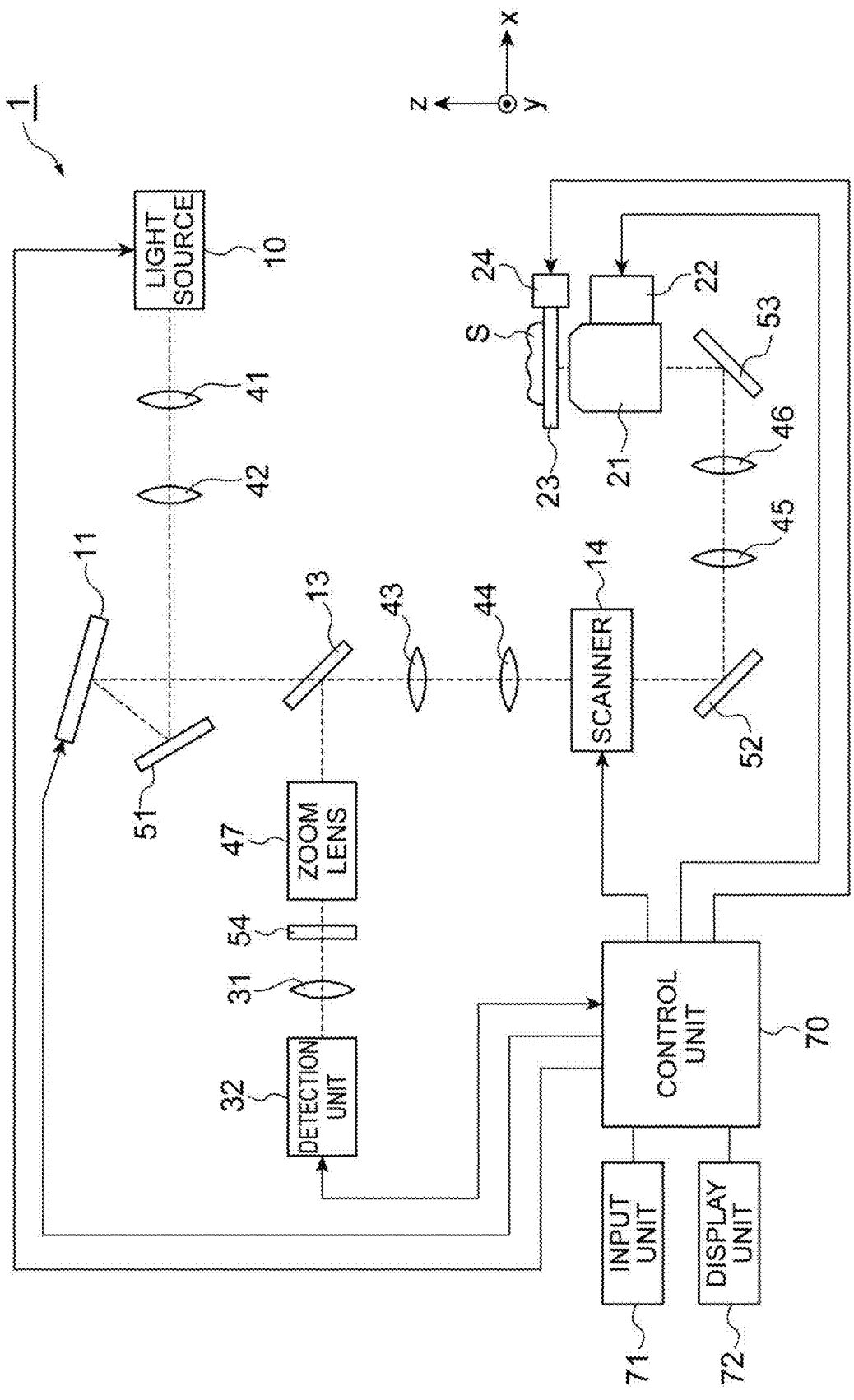
FIG. 1 is a diagram showing a configuration of an image acquisition apparatus 1.

FIG. 1 is a diagram showing a configuration of an image acquisition apparatus 1. The image acquisition apparatus 1 includes a light source 10, a spatial light modulator 11, a dichroic mirror 13, an optical scanner 14, an objective lens 21, a stage 23, an imaging lens 31, a detection unit 32, a control unit 70, and the like.

The light source 10 outputs excitation light of a wavelength capable of exciting a fluorescent label included in an observation object S, and is preferably a laser light source. To generate fluorescence by multiphoton absorption in the observation object S, the light source 10 is preferably a laser light source that outputs laser light of short pulse such as femtosecond, picosecond, and nanosecond as the excitation light.

Lenses 41 and 42 that input the excitation light output from the light source 10 constitute a beam expander that adjusts a beam diameter and outputs the excitation light. The beam expander is generally configured to include a plurality of lenses. The beam diameter of the excitation light output from the beam expander is appropriately set according to a pupil diameter of the objective lens 21.

The spatial light modulator 11 inputs the excitation light output from the light source 10 and reflected by a mirror 51 via the beam expander (lenses 41 and 42), spatially modulates the input excitation light, and outputs the light. The spatial light modulator 11 may be of a phase modulation type or an amplitude modulation type. Although the spatial light modulator 11 is shown as a reflection type in FIG. 1, it may be of a transmission type. The spatial light modulator 11 can spatially modulate the phase or the amplitude in a beam cross-section of the output light, according to a presented modulation pattern.

The spatial light modulator 11 presents a predetermined modulation pattern, and can perform focused irradiation on a plurality of irradiation regions on a surface or inside of the observation object S with the modulated excitation light. In this case, the spatial light modulator 11 is used as a multi-point generation element that generates a plurality of light beams from a single light beam output from the light source 10.

The spatial light modulator 11 used as the multi-point generation element can freely set the number of light beams, an interval of the light beams, a depth (z-direction position) of a focusing position of each light beam, and the like, according to the modulation pattern presented by an electric control signal provided by the control unit 70. These are set according to the number of partial regions or a size of each partial region when a region to be observed in the observation object S is divided into a plurality of partial regions. In addition to the spatial light modulator, a diffraction optical element, a microlens array, a beam splitter, or the like can be used as the multi-point generation element.

Further, the spatial light modulator 11 can also be used as a scanning unit that scans a plurality of irradiation regions in the observation object S by changing the presented modulation pattern. In addition, the predetermined modulation pattern is presented, so that the spatial light modulator 11 can correct aberration of an optical path reaching the plurality of irradiation regions in the observation object S, reduce each irradiation region, and increase the resolution of an image to be acquired.

The dichroic mirror 13 selectively transmits the excitation light in the excitation light and the fluorescence and selectively reflects the fluorescence. That is, the dichroic mirror 13 inputs the excitation light arriving from the spatial light modulator 11 and transmits the excitation light to a lens 43. Further, the dichroic mirror 13 inputs the fluorescence arriving from the lens 43 and reflects the fluorescence to a zoom lens 47.

Lenses 43 and 44 that input the excitation light output from the dichroic mirror 13 constitute a telecentric relay lens system.

The optical scanner 14 is used as a scanning unit that inputs the excitation light output from the dichroic mirror 13 and passed through the telecentric relay lens system (lenses 43 and 44) and scans an irradiation region in a direction intersecting with a direction (z direction) of excitation light irradiation on the observation object S. Further, the optical scanner 14 inputs the fluorescence generated in the irradiation region of the observation object S and performs descanning, thereby matching principal rays of the excitation light and the fluorescence between the dichroic mirror 13 and the optical scanner 14 with each other. The optical scanner 14 includes, for example, a galvano mirror, a polygon mirror, a MEMS (micro electro mechanical systems) mirror, and a gimbal mirror.

Lenses 45 and 46 that input the excitation light output from the optical scanner 14 and reflected by a mirror 52 constitute a telecentric relay lens system. The telecentric relay lens system (lenses 43 and 44) and the telecentric relay lens system (lenses 45 and 46) transfer a wave front of the excitation light modulated and generated by the spatial light modulator 11 to a back focal plane of the objective lens 21.

Here, when the microlens array is used as the multi-point generation element, the telecentric relay lens systems transfer focusing points near the microlens array to the back focal plane of the objective lens 21. When the multi-point generation element and the objective lens 21 are very close to each other, the telecentric relay lens systems may not be provided.

The objective lens 21 is disposed to face the observation object S on the stage 23. The objective lens 21 inputs the excitation light output from the telecentric relay lens system (lenses 45 and 46) and reflected by a mirror 53 and performs focused irradiation on the plurality of irradiation regions on the surface or inside of the observation object S on the stage 23 with the excitation light. Further, the objective lens 21 inputs fluorescence when the fluorescence is generated in any irradiation region of the observation object S and outputs the fluorescence to the mirror 53.

The objective lens 21 can move in an optical axis direction, that is, a depth direction (z direction) of the observation object S by the action of an objective lens moving mechanism 22. The stage 23 can move in a direction intersecting with the optical axis direction of the objective lens 21 (preferably, in a direction parallel to an xy plane) by the action of a stage moving mechanism 24, and further, can move in the optical axis direction, that is, the depth direction (z direction) of the observation object S. The objective lens moving mechanism 22 and the stage moving mechanism 24 are also used as a scanning unit that scans the plurality of irradiation regions in the observation object S. Each of the objective lens moving mechanism 22 and the stage moving mechanism 24 includes, for example, a stepping motor, a piezo actuator, or the like.

In the configuration shown in FIG. 1, although the single objective lens 21 is used for both excitation light irradiation and fluorescence observation, an objective lens for excitation light irradiation and an objective lens for fluorescence observation may be separately provided. By using a high-NA lens as the objective lens for the excitation light irradiation, an influence of aberration can be reduced and local focusing can be performed. By using a lens with a large pupil diameter as the objective lens for the fluorescence observation, more fluorescence can be input.

In FIG. 1, although a microscope including the objective lens 21 has an inverted configuration, a configuration of an upright microscope may be used.

The fluorescence generated in the irradiation region of the observation object S and input to the objective lens 21 arrives at the dichroic mirror 13 by following the same path as a path of the excitation light in an opposite direction and is reflected by the dichroic mirror 13. The zoom lens 47 and the imaging lens 31 that input the fluorescence reflected by the dichroic mirror 13 guide the fluorescence generated in the irradiation region of the observation object S to a light receiving surface of the detection unit 32 and form a fluorescence image on the light receiving surface. A filter 54 is provided on an optical path between the dichroic mirror 13 and the detection unit 32 and selectively transmits the fluorescence in the excitation light and the fluorescence and selectively blocks the excitation light. The filter 54 can suppress the detection unit 32 from receiving the excitation light partially reflected by the dichroic mirror 13 in the excitation light scattered or reflected by the observation object S or the like.

Here, an element group on an optical path of the excitation light from the light source 10 to the observation object S constitutes an irradiation optical system for performing focused irradiation on the plurality of irradiation regions on the surface or inside of the observation object S with the excitation light output from the light source 10. An element group on an optical path of the fluorescence from the observation object S to the detection unit 32 constitutes an imaging optical system for guiding and imaging light generated in each of the plurality of irradiation regions in response to excitation light irradiation on the observation object S by the irradiation optical system.

The detection unit 32 has a light receiving surface on which the plurality of irradiation regions in the observation object S are imaged by the imaging optical system, a plurality of pixels are arranged one-dimensionally or two-dimensionally on the light receiving surface, and the detection unit outputs a detection signal having a value according to a light receiving amount in each of the plurality of pixels. The detection unit 32 includes a photodetector such as, for example, a multi-anode photomultiplier tube, an MPPC (registered trademark), a photodiode array, an avalanche photodiode array, a CCD image sensor, and a CMOS image sensor.

The multi-anode photomultiplier tube (hereinafter, referred to as "mPMT") has a plurality of anodes as a plurality of pixels and can output a detection signal according to a light receiving amount of each anode. The MPPC (multi-pixel photon counter) is obtained by two-dimensionally arranging a plurality of pixels, each of which has a quenching resistor connected to an avalanche photodiode operating in a Geiger mode. These can perform high-speed and high-sensitivity light detection.

A pinhole array may be disposed in front of the light receiving surface of the detection unit 32 and an optical system between the irradiation region of the observation object S and a pinhole may be used as a confocal optical system. The pinhole array may be disposed immediately before the light receiving surface of the detection unit 32 or may be disposed with the relay lens system between the light receiving surface of the detection unit 32 and the pinhole array. This is effective for detecting the fluorescence by single photon excitation or detecting reflected scattered light.

The control unit 70 controls a whole operation of the image acquisition apparatus 1. Specifically, the control unit 70 controls a light output operation by the light source 10, generates a modulation pattern to be provided to the spatial light modulator 11, and provides the modulation pattern to the spatial light modulator 11. The control unit 70 drives the optical scanner 14 and drives the objective lens moving mechanism 22 to move the objective lens 21, so that the control unit scans the irradiation region in the observation object S. The control unit 70 may drive the stage moving mechanism 24 to move the stage 23, so that the control unit can scan the irradiation region in the observation object S.

In addition, the control unit 70 controls a light detection operation by the detection unit 32. The control unit 70 is also used as an image generation unit that receives a detection signal output from the detection unit 32 and generates an image of the observation object S on the basis of the detection signal. This will be described later.

The control unit 70 is, for example, a computer and has at least an image processing circuit. The control unit 70 is used together with an input unit 71 and a display unit 72. The input unit 71 is, for example, a keyboard or a mouse, and inputs a measurement start instruction, a measurement condition instruction, or the like. The display unit 72 is, for example, a display, and displays measurement conditions or displays an image of the observation object S.

A schematic operation of the image acquisition apparatus 1 is as follows. The irradiation optical system performs focused irradiation on the plurality of irradiation regions on the surface or inside of the observation object S with the excitation light output from the light source 10. That is, the beam diameter of the excitation light output from the light source 10 is adjusted by the beam expander (lenses 41 and 42) and the excitation light is reflected by the mirror 51 and is input to the spatial light modulator 11. The phase or the amplitude is spatially modulated in a beam cross-section of the excitation light by the spatial light modulator 11 in which the modulation pattern provided by the control unit 70 is presented and the modulated excitation light is output from the spatial light modulator 11.

The excitation light output from the spatial light modulator 11 transmits the dichroic mirror 13 and is input to the optical scanner 14 via the telecentric relay lens system (lenses 43 and 44). The optical scanner 14 changes an output direction of the excitation light from the optical scanner 14. The excitation light output from the optical scanner 14 is reflected by the mirror 52, passes through the telecentric relay lens system (lenses 45 and 46), is reflected by the mirror 53, and is input to the objective lens 21.

The excitation light input to the objective lens 21 is focused and incident on the surface or inside of the observation object S on the stage 23. At this time, the number of irradiation regions, the interval thereof, and the like in the observation object S are set according to the modulation pattern presented in the spatial light modulator 11 by the control unit 70. A position on the xy plane of the irradiation region in the observation object S is scanned by the optical scanner 14 driven by the control unit 70. A position of the z direction of the irradiation region in the observation object S is scanned by moving the objective lens 21 in the z direction by the objective lens moving mechanism 22 driven by the control unit 70 or is scanned by moving the stage 23 in the z direction by the stage moving mechanism 24 driven by the control unit 70.

The fluorescence generated in the irradiation region of the observation object S and input to the objective lens 21 is imaged on the light receiving surface of the detection unit 32 by the imaging optical system. That is, the fluorescence is reflected by the dichroic mirror 13 via the objective lens 21, the mirror 53, the telecentric relay lens system (lenses 46 and 45), the mirror 52, the optical scanner 14, and the telecentric relay lens system (lenses 44 and 43). By the descanning action of the optical scanner 14 for the fluorescence, the principal rays of the excitation light and the fluorescence between the dichroic mirror 13 and the optical scanner 14 are matched with each other. The fluorescence reflected by the dichroic mirror 13 arrives at the light receiving surface of the detection unit 32 via the zoom lens 47, the filter 54, and the imaging lens 31. The irradiation region in the observation object S is imaged on the light receiving surface of the detection unit 32.

Further, a detection signal of a value according to a light receiving amount in each of the plurality of pixels arranged on the light receiving surface of the detection unit 32 is output from the detection unit 32. The detection signal output from the detection unit 32 is input to the control unit 70. An image of the observation object S is generated by the control unit 70 functioning as the image generation unit on the basis of the detection signal output from the detection unit 32. The image is displayed by the display unit 72.

Figure 2:
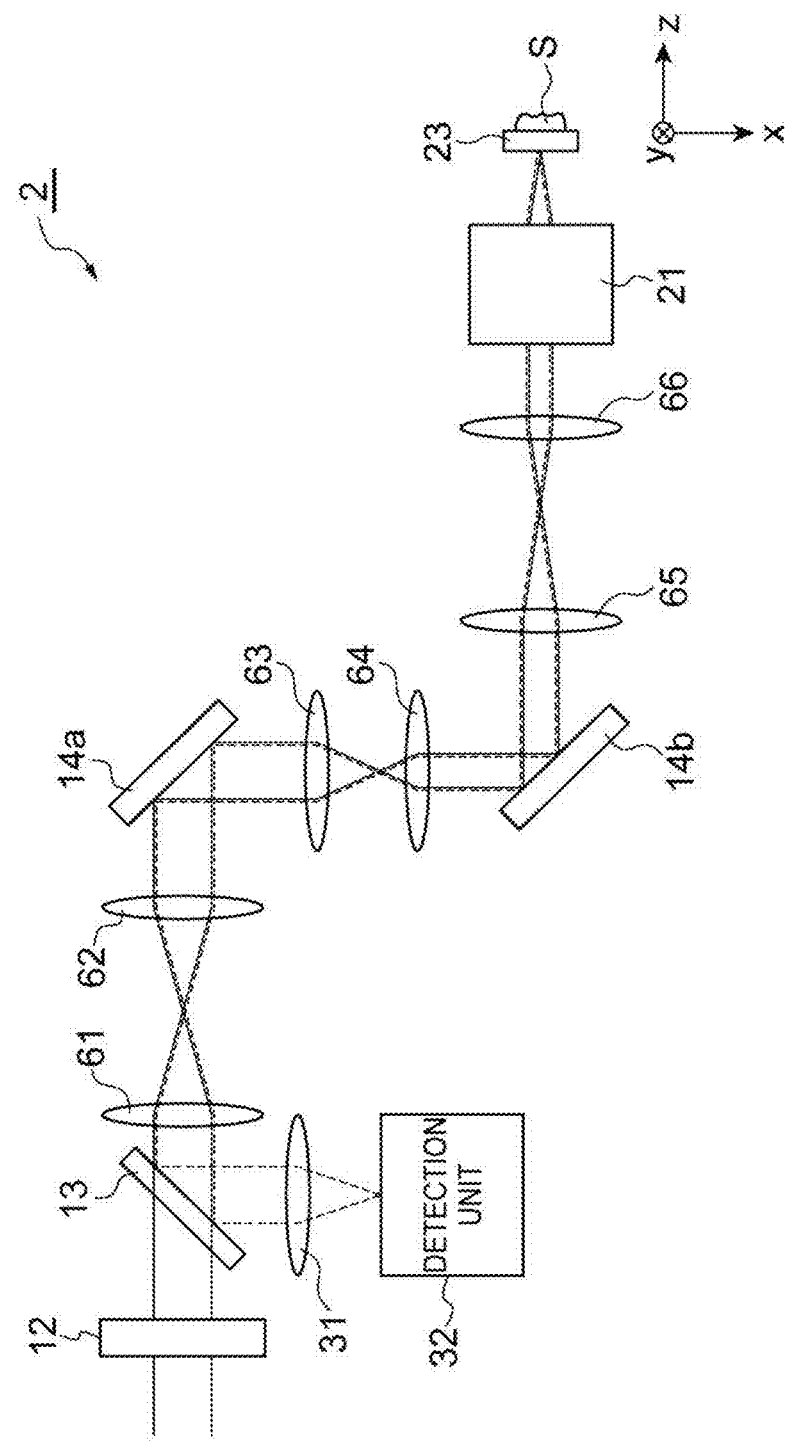
FIG. 2 is a diagram showing a configuration of an image acquisition apparatus 2.

Although the image acquisition apparatus 1 shown in FIG. 1 includes the reflection type spatial light modulator, as shown in FIG. 2, a configuration of an image acquisition apparatus 2 having a transmission type spatial light modulator may be used. FIG. 2 is a diagram showing the configuration of the image acquisition apparatus 2. This figure shows an irradiation optical system of the excitation light from a transmission type spatial light modulator 12 to the observation object S and an imaging optical system of the fluorescence from the observation object S to the detection unit 32.

A dichroic mirror 13, an objective lens 21, a stage 23, an imaging lens 31, and a detection unit 32 included in the image acquisition apparatus 2 shown in FIG. 2 are the same as those included in the image acquisition apparatus 1 shown in FIG. 1. As with the configuration of the image acquisition apparatus 1, the image acquisition apparatus 2 includes a light source, a beam expander, an objective lens moving mechanism, a stage moving mechanism, a control unit, and the like, which are not shown in FIG. 2.

The spatial light modulator 12 can spatially modulate the phase or the amplitude in the beam cross-section of the excitation light at the time of transmitting the excitation light. As with the reflection type spatial light modulator 11, the transmission type spatial light modulator 12 can perform focused irradiation on the plurality of irradiation regions on the surface or inside of the observation object S with the modulated excitation light, can also be used as a scanning unit that scans the plurality of irradiation regions in the observation object S, and can correct aberration of an optical path reaching the plurality of irradiation regions in the observation object S.

Optical scanners 14a and 14b are provided as a scanning unit that scans the irradiation region in a direction intersecting with a direction of excitation light irradiation on the observation object S. One optical scanner 14a inputs the excitation light arriving from the spatial light modulator 12 via the dichroic mirror 13 and a telecentric relay lens system (lenses 61 and 62) and scans the irradiation region in a first direction intersecting with the direction of excitation light irradiation on the observation object S. The other optical scanner 14b inputs the excitation light arriving from the optical scanner 14a via a telecentric relay lens system (lenses 63 and 64) and scans the irradiation region in a second direction intersecting with the direction of excitation light irradiation on the observation object S. For example, one of the first direction and the second direction is an x direction and the other is a y direction.

A schematic operation of the image acquisition apparatus 2 is as follows. The irradiation optical system performs focused irradiation on the plurality of irradiation regions on the surface or inside of the observation object S with the excitation light output from the light source. That is, the beam diameter of the excitation light output from the light source is adjusted by the beam expander and the excitation light is input to the spatial light modulator 12. The phase or the amplitude is spatially modulated in a beam cross-section of the excitation light by the spatial light modulator 12 in which the predetermined modulation pattern is presented and the modulated excitation light is output from the spatial light modulator 12.

The excitation light output from the spatial light modulator 12 transmits the dichroic mirror 13 and is input to the optical scanner 14a via the telecentric relay lens system (lenses 61 and 62). The optical scanner 14a changes an output direction of the excitation light from the optical scanner 14a. The excitation light output from the optical scanner 14a is input to the optical scanner 14b via the telecentric relay lens system (lenses 63 and 64). The optical scanner 14b changes an output direction of the excitation light from the optical scanner 14b. The excitation light output from the optical scanner 14b is input to the objective lens 21 via the telecentric relay lens system (lenses 65 and 66).

The excitation light input to the objective lens 21 is focused and incident on the surface or inside of the observation object S on the stage 23. At this time, the number of irradiation regions, the interval thereof, and the like in the observation object S are set according to the modulation pattern presented in the spatial light modulator 12. The position on the xy plane of the irradiation region in the observation object S is scanned by the optical scanners 14a and 14b. A position of the z direction of the irradiation region in the observation object S is scanned by moving the objective lens 21 in the z direction by the objective lens moving mechanism or is scanned by moving the stage 23 in the z direction by the stage moving mechanism.

The fluorescence generated in the irradiation region of the observation object S and input to the objective lens 21 is imaged on the light receiving surface of the detection unit 32 by the imaging optical system. That is, the fluorescence is reflected by the dichroic mirror 13 via the objective lens 21, the telecentric relay lens system (lenses 66 and 65), the optical scanner 14b, the telecentric relay lens system (lenses 64 and 63), the optical scanner 14a, and the telecentric relay lens system (lenses 62 and 61). By the descanning action of the optical scanners 14a and 14b for the fluorescence, the principal rays of the excitation light and the fluorescence between the dichroic mirror 13 and the optical scanner 14b are matched with each other. The fluorescence reflected by the dichroic mirror 13 arrives at the light receiving surface of the detection unit 32 via the imaging lens 31. The irradiation region in the observation object S is imaged on the light receiving surface of the detection unit 32.

Further, a detection signal of a value according to a light receiving amount in each of the plurality of pixels arranged on the light receiving surface of the detection unit 32 is output from the detection unit 32. An image of the observation object S is generated on the basis of the detection signal output from the detection unit 32 by the control unit functioning as the image generation unit. The image is displayed by the display unit.

The present invention can be applied to either of the two configurations shown in FIG. 1 and FIG. 2. The image acquisition apparatus and the image acquisition method according to the present embodiment mainly relate to the plurality of irradiation regions in the observation object S and a relation between pixel structures and imaging regions on the light receiving surface of the detection unit 32 and improve an SN ratio of the image of the observation object S on the basis of the relation.

Each of the image acquisition apparatuses 1 and 2 is suitably used as laser scanning fluorescence microscopy (hereinafter referred to as "LSFM") that performs multi-point scanning. Further, among the LSFM that perform the multi-point scanning, those irradiate the observation object S with short-pulse laser light as the excitation light, and detect the fluorescence by multiphoton excitation is called multifocal multiphoton microscopy (hereinafter, referred to as "MMM"). Each of the image acquisition apparatuses 1 and 2 can also be suitably used as MMM.

In the case of the multiphoton excitation, a wavelength of the excitation light is long and the fluorescence is generated only in a limited region where a photon density of the excitation light is high in the observation object, as compared with the case of the single photon excitation. Therefore, in the case of the multiphoton excitation, an influence of scattering or absorption of the excitation light is small and the multiphoton excitation is suitable for acquiring a fluorescence image of a deep portion of the observation object in particular. Further, by controlling the wave front of the excitation light by the spatial light modulator, it is possible to correct the aberration due to a refractive index difference between the observation object and a surrounding medium (for example, water, air, oil, or the like) and to perform focused irradiation on a local irradiation region inside the observation object with the excitation light. Therefore, in the case of the multiphoton excitation, it is possible to obtain an image having both high fluorescence intensity and resolution even at a deep position of the observation object and it is possible to acquire the fluorescence image of the deep portion of the observation object at high speed by combining the multi-point scanning and the aberration correction.

When the intensity of the excitation light output from the light source 10 has a sufficient margin with respect to the intensity of the excitation light necessary for exciting fluorescent molecules contained in the observation object S to generate the fluorescence and damage to the observation object S is small even if the multi-point scanning is performed, LSFM or MMM performing the multi-point scanning is extremely effective for the high speed.

For example, in two-photon excitation fluorescence microscopy, a laser light source that outputs pulsed laser light having a pulse width of femtoseconds or picoseconds is used, however, to obtain a stable output in the laser light source, a laser light output is extremely large such as about 3 W. In contrast, a light amount of the excitation light irradiation to generate the fluorescence in the observation object may be about 10 mW at a shallow position close to the surface of the observation object. As such, the laser light output has a margin of about 300 times with respect to the intensity of the excitation light necessary for generating the fluorescence. Further, as long as two adjacent irradiation positions are not extremely close to each other, heat accumulation is small.

FIG. 3 includes diagrams for explaining the single-point scanning and the multi-point scanning. This figure shows a state of scanning of the irradiation region in the observation object S when viewed parallel to the z direction. In the single-point scanning shown in (a) in FIG. 3, one irradiation region A is raster-scanned over the entire region to be observed in the observation object S. In four-point scanning shown in (b) in FIG. 3, the region to be observed in the observation object S is equally divided into four partial regions $S_1$ to $S_4$ and an irradiation region $A_n$ is raster-scanned in each partial region $S_n$. In the four-point scanning, four irradiation regions $A_1$ to $A_4$ are scanned simultaneously. Therefore, as compared with the single-point scanning, a measurement time can be shortened to ¼ in the four-point scanning.

FIG. 25 includes diagrams for explaining an another example of multi-point scanning. This figure also shows a state of scanning of the irradiation regions $A_1$ to $A_4$ in the observation object S when viewed parallel to the z direction. In this example, as shown in (a) in FIG. 25, the irradiation regions $A_1$ to $A_4$ are arranged on a straight line parallel to a fast axis at the time of the raster scanning. In this multi-point scanning, although the measurement time cannot be shortened, the irradiation regions $A_1$ to $A_4$ sequentially pass through respective positions in a hatching region (region where scan ranges of the irradiation regions $A_1$ to $A_4$ overlap) shown in (b) in FIG. 25 at a short time interval. Therefore, it is possible to easily confirm the movement of, for example, a fluorescent protein or the like. In this multi-point scanning, a plurality of images of different times are output at a certain observation point in the observation object S. Even in this case, eventually, the multiple points are measured simultaneously, so that scattering of fluorescence excited by another excitation light is also included in another image.

FIG. 4 includes diagrams for explaining the irradiation regions $A_1$ to $A_4$ in the observation object S in the case of four-point scanning and imaging regions $B_1$ to $B_4$ on the light receiving surface of the detection unit 32. (a) in FIG. 4 shows the objective lens 21 and the observation object S and schematically shows the four irradiation regions $A_1$ to $A_4$ in the observation object S. (b) in FIG. 4 shows the imaging lens 31 and the detection unit 32 and schematically shows four pixels $P_1$ to $P_4$ and four imaging regions $B_1$ to $B_4$ on the light receiving surface of the detection unit 32.

Each imaging region $B_n$ on the light receiving surface of the detection unit 32 is in an imaging relation by the imaging optical system with the irradiation region $A_n$ in the observation object S. In the observation object S, the four irradiation regions $A_1$ to $A_4$ are separated from each other, and on the light receiving surface of the detection unit 32, the four imaging regions $B_1$ to $B_4$ are also separated from each other. Each pixel $P_n$ corresponds to the imaging region $B_n$ and outputs a detection signal of a value according to a light receiving amount in the imaging region $B_n$.

Figure 5:
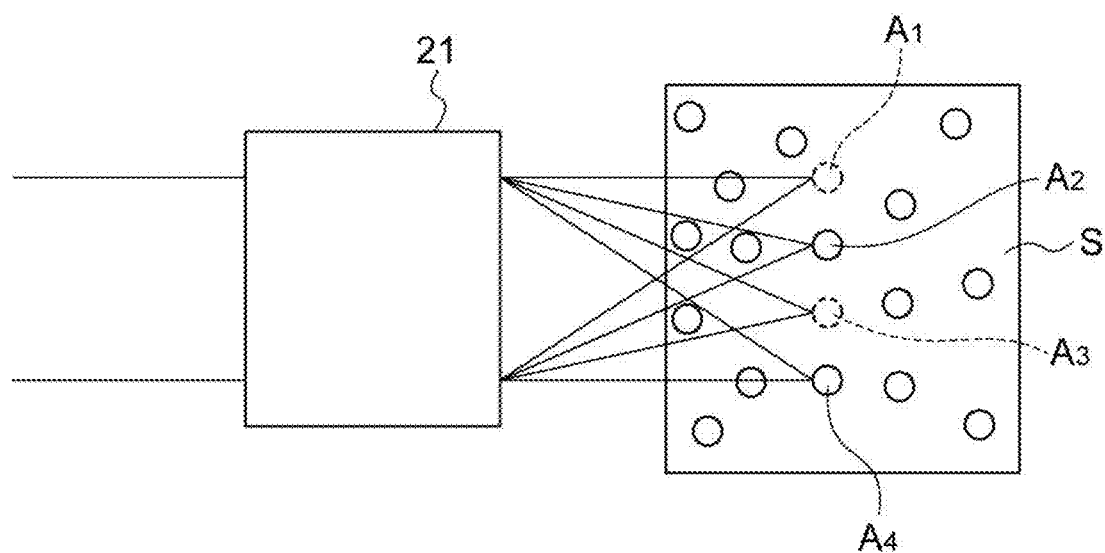
FIG. 5 is a diagram showing irradiation regions $A_1$ to $A_4$ and a distribution of fluorescent beads in an observation object S.

FIG. 5 is a diagram showing the irradiation regions $A_1$ to $A_4$ and a distribution of fluorescent beads in the observation object S in the case of the four-point scanning. In this figure, a resultant obtained by dispersing a plurality of fluorescent beads shown by solid line circles in an epoxy resin is assumed as the observation object S. Further, in this figure, it is assumed that the fluorescent beads exist in the irradiation regions $A_2$ and $A_4$, and the fluorescent beads do not exist in the irradiation regions $A_1$ and $A_3$ shown by dashed line circles. In the case of the example shown in this figure, the fluorescence arrives at each of the imaging regions $B_2$ and $B_4$ among the four imaging regions $B_1$ to $B_4$ on the light receiving surface of the detection unit 32 and the fluorescence does not arrive at the imaging regions $B_1$ and $B_3$.

However, the fluorescent beads to be factors of scattering, diffraction, and aberration exist in optical paths of the excitation light and the fluorescence between the objective lens 21 and each irradiation region in the observation object S. For this reason, the light receiving region on which the fluorescence actually arrives on the light receiving surface of the detection unit 32 spreads more than an imaging region based on the imaging relation by the imaging optical system with the irradiation region in the observation object S. The extent of the spread depends on the magnitude of scattering or aberration in the observation object S. In general, when the irradiation region is in the vicinity of the surface of the observation object, the extent of the spread of the light receiving region is smallest. The extent of the spread of the light receiving region increases when the irradiation region becomes deeper in the observation object. This is also applied to a living body or the like to be an actual observation object.

Figure 6:
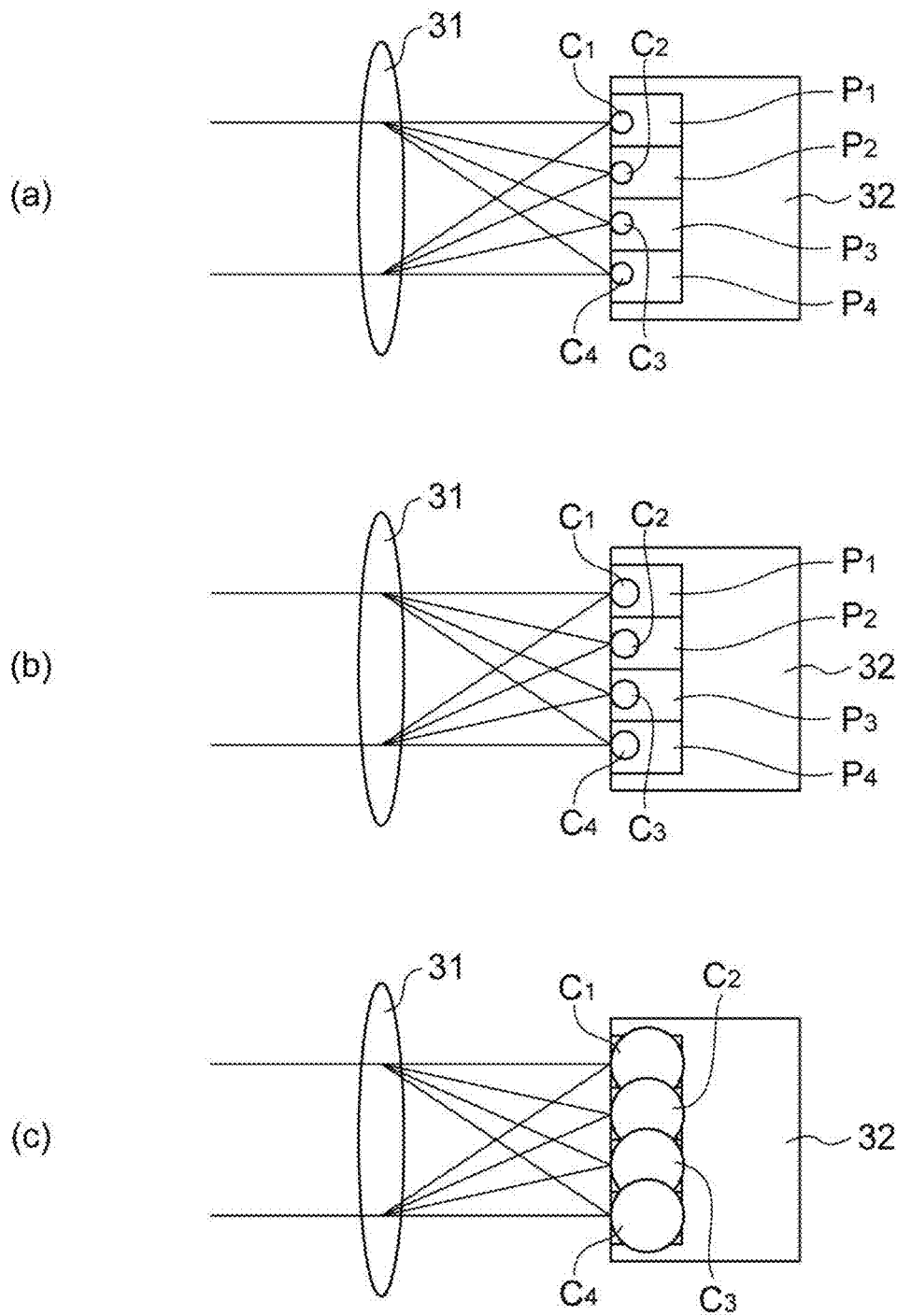
FIG. 6 includes (a)-(c) diagrams for explaining the spread of a light receiving region on a light receiving surface of a detection unit 32.

FIG. 6 includes diagrams for explaining the spread of the light receiving region on the light receiving surface of the detection unit 32 in the case of the four-point scanning. In this figure, a size of the light receiving region on which the fluorescence actually arrives is shown by a size of a circle. (a) in FIG. 6 shows the case where the irradiation region is located in the vicinity of the surface of the observation object. (b) in FIG. 6 shows the case where the irradiation region is located at a shallow position in the observation object. Further, (c) in FIG. 6 shows the case where the irradiation region is located at a deep position in the observation object.

As shown in (a) in FIG. 6, when the irradiation region is located in the vicinity of the surface of the observation object, the light receiving region $C_n$ has almost the same spread as the imaging region $B_n$ and is included in only the corresponding pixel $P_n$. However, when the irradiation region becomes deeper in the observation object, the extent of the spread of the light receiving region $C_n$ becomes larger than that of the imaging region $B_n$. As shown in (c) in FIG. 6, the light receiving region $C_n$ extends to not only the corresponding pixel $P_n$ but also adjacent pixels $P_{n-1}$ and $P_{n+1}$. That is, a part of a detection signal to be originally output from the pixel $P_n$ may be added to detection signals output from the adjacent pixels $P_{n-1}$ and $P_{n+1}$. As a result, an SN ratio of the fluorescence image of the observation object S generated on the basis of the detection signal is deteriorated.

Figure 7:
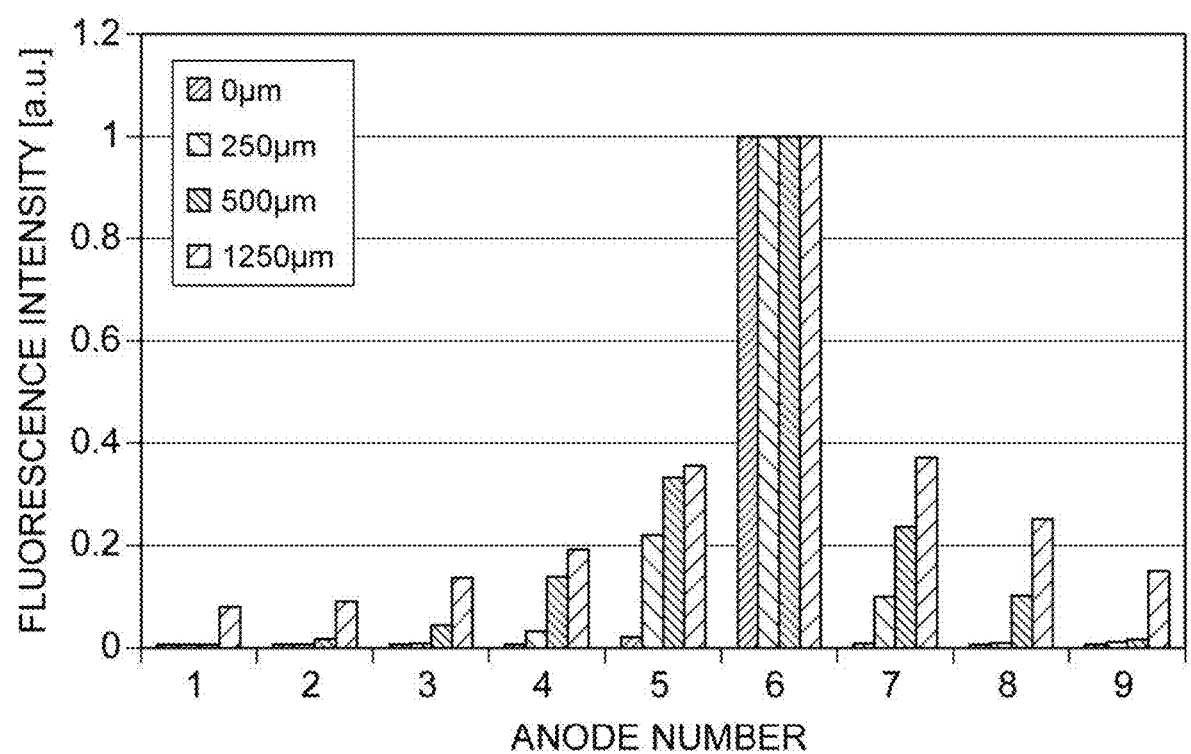
FIG. 7 is a graph showing the fluorescence intensity in each pixel of a detection unit 32 in the case of single-point scanning.

FIG. 7 is a graph showing the fluorescence intensity in each pixel of the detection unit 32 in the case of the single-point scanning. Here, a resultant obtained by dispersing the fluorescent beads in an epoxy resin is used as the observation object S and mPMT is used as the detection unit 32. A predetermined modulation pattern is presented in the spatial light modulator such that a single irradiation region can be scanned on the surface or inside of the observation object S. This figure shows the spread of the light receiving region on the light receiving surface of the detection unit 32 when the single irradiation region is set to each of the surface (depth 0 μm), a depth 250 μm, a depth 500 μm, and a depth 1250 μm in the observation object S. A horizontal axis represents an anode number (pixel position) of mPMT functioning as the detection unit 32.

When the single irradiation region is set to the surface (depth 0 μm) of the observation object S, the fluorescence arrives at only a single anode 6 among nine anodes 1 to 9 of mPMT. This shows that only the anode 6 exists in the imaging region on the light receiving surface in the imaging relation with the irradiation region in the observation object S. Because there is no influence of scattering on the surface (depth 0 μm) of the observation object S, the fluorescence arrives at only the anode 6.

As the position of the single irradiation region in the observation object S becomes deeper, an amount of fluorescence arriving at the anodes 5 and 7 and the like adjacent to the anode 6 increases and the light receiving region on the light receiving surface of the detection unit 32 spreads. The anodes 5 and 7 and the like do not exist in the imaging region in the imaging relation with the irradiation region in the observation object S. The spread of the light receiving region on the light receiving surface is caused by an influence of scattering and aberration in the observation object S.

In the case of the single-point scanning, a total amount of fluorescence arriving at the entire light receiving surface of the detection unit 32 may be obtained by obtaining a total sum of detection signals output from all the anodes 1 to 9. Alternatively, in the case of the single-point scanning, the total amount of fluorescence may be obtained by using a detection unit of a single channel (single pixel) instead of the detection unit 32 in which the plurality of pixels are arranged on the light receiving surface. In particular, in the case of the multiphoton excitation, the excitation probability increases only in the vicinity of a focusing point where a photon density is high and the fluorescence is generated, and therefore, if there is no influence of the aberration and scattering on the excitation light, the fluorescence is generated from only a position to be observed (that is, a position near a position where the excitation light is focused). From this, even if the fluorescence generated from a certain local irradiation region spreads on the light receiving surface of the detection unit, the total amount of fluorescence may be detected. The detection signal output from the detection unit at that time can be said to collect all the fluorescence generated from the local irradiation region if an influence of absorption is ignored.

In contrast, in the case of the multi-point scanning, there are a plurality of imaging regions separated from each other on the light receiving surface of the detection unit 32 by the imaging relation by the imaging optical system, with the plurality of irradiation regions separated from each other in the observation object S. If the fluorescence is generated in any one of the plurality of irradiation regions in the observation object S, on the light receiving surface of the detection unit 32, the fluorescence arrives at the imaging region in the imaging relation with the irradiation region where the fluorescence is generated, and further, if there is an influence of scattering and aberration, the actual light receiving region spreads more than the imaging region.

Figure 8:
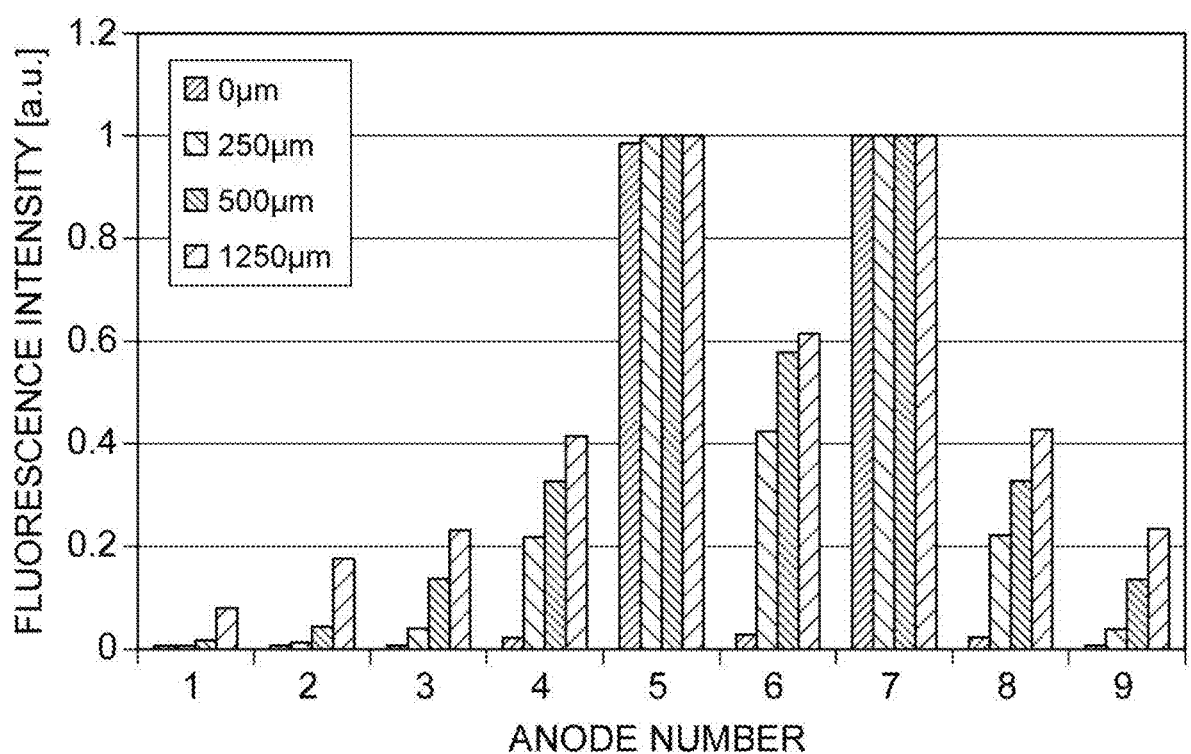
FIG. 8 is a graph showing the fluorescence intensity in each pixel of a detection unit 32 in the case of two-point scanning.

FIG. 8 is a graph showing the fluorescence intensity in each pixel of the detection unit 32 in the case of the two-point scanning. This figure shows a simulation result in the case of the two-point scanning performed using the actual measurement result shown in FIG. 7. This figure shows the spread of the light receiving region on the light receiving surface of the detection unit 32 when two irradiation regions are set to each of the surface (depth 0 μm), a depth 250 μm, a depth 500 μm, and a depth 1250 μm in the observation object S.

When the two irradiation regions are set to the surface (depth 0 μm) of the observation object S, the fluorescence arrives at only two anodes 5 and 7 among nine anodes 1 to 9 of mPMT. This shows that the anode 5 exists in the imaging region on the light receiving surface in the imaging relation with one irradiation region in the observation object S, and that the anode 7 exists in the imaging region on the light receiving surface in the imaging relation with the other irradiation region in the observation object S.

As the positions of the two irradiation regions in the observation object S become deeper, an amount of fluorescence arriving at the anodes 4, 6, and 8 and the like other than the anodes 5 and 7 increases. The anodes 4, 6, and 8 and the like do not exist in the two imaging regions in the imaging relation with the two irradiation regions in the observation object S. The fluorescence detected by the anodes 4, 6, and 8 and the like should not be originally detected by these anodes. The detection signals output from the anodes 4, 6, and 8 and the like other than the anodes 5 and 7 become noise at the time of generating the fluorescence image of the observation object S.

Due to an influence of the noise, a ghost image is generated or background noise increases, in the fluorescence image of the observation object S to be generated. The ghost image and the background noise are caused by detection signals (noise) output from pixels having detected the fluorescence which should not be originally detected. However, in some cases, the influence of the noise appears as the ghost image in the fluorescence image of the observation object S and in some other cases, the influence of the noise appears as the background noise.

The ghost image is generated when fluorescence generation regions are relatively sparse in a wide range of the observation object S or when an SN ratio of a fluorescence signal is high. For example, it is assumed that the multi-point scanning is performed using a resultant obtained by dispersing the fluorescent beads in an epoxy resin as the observation object S. When the dispersion density of the fluorescent beads is relatively small, a region where the fluorescence can be generated is small and in the case of the multi-point scanning, the fluorescence may be generated in only a certain irradiation region among the plurality of irradiation regions. Further, because the fluorescence intensity is strong, the SN ratio is relatively high. At this time, the actual light receiving region spreads on the light receiving surface of the detection unit 32 as described above, so that it is observed as the noise in other pixels. The noise due to the spread of the actual light receiving region is relatively strong as compared with noise such as a dark current and readout noise originally generated in the pixel, and if other fluorescence does not arrive at the pixel, a bead that should not exist, that is, the ghost image is observed by the pixel.

FIG. 9 includes diagrams showing fluorescence images of the observation object in the case of each of the single-point scanning and the four-point scanning. Here, a resultant obtained by dispersing the fluorescent beads in an epoxy resin is used as the observation object S. (a) in FIG. 9 shows the fluorescence image of the observation object in the case of the single-point scanning. (b) in FIG. 9 shows the fluorescence image of the observation object in the case of the four-point scanning. Further, (b) in FIG. 9 shows a start position of scanning (raster scan) in each partial region by an arrow, when a region to be observed in the observation object S is equally divided into four partial regions $S_1$ to $S_4$. In the partial region $S_3$ of the fluorescence image ((b) in FIG. 9) in the case of the four-point scanning, the fluorescent bead is recognized at the same position as that of the fluorescent bead in the fluorescence image ((a) in FIG. 9) in the case of the single-point scanning. In addition, in the partial regions $S_2$ and $S_4$ of the fluorescence image ((b) in FIG. 9) in the case of the four-point scanning, the fluorescent beads are observed due to occurrence of the ghost in a range surrounded by dashed line circles.

Meanwhile, in the case where the fluorescence generation regions are not relatively sparse in the entire observation region of the observation object S, if the SN ratio of the fluorescence signal is low, the fluorescence due to scattering is observed as the background noise. For example, two or more fluorescence signals may be mixed in each pixel of the detection unit 32 or the observed fluorescence may be in a wide range in the image.

In any case, if the ghost image occurs, an image that should not be observed is observed and if the background noise occurs, the SN ratio decreases. As a result, an observation depth in the observation object S may be limited. The present embodiment is to reduce an influence of the noise and to improve the SN ratio of the image of the observation object generated by the multi-point scanning.

FIG. 10 includes diagrams for explaining a relation between the pixel structures and the imaging regions on the light receiving surface of the detection unit 32. In this figure, ten pixels $P_1$ to $P_{10}$ that are one-dimensionally arranged on the light receiving surface of the detection unit 32 are shown.

In an example of (a) in FIG. 10, the pixel $P_4$ corresponds to the imaging region $B_1$, the pixel $P_5$ corresponds to the imaging region $B_2$, the pixel $P_6$ corresponds to the imaging region $B_3$, and the pixel $P_7$ corresponds to the imaging region $B_4$. The pixels $P_1$ to $P_3$ and $P_8$ to $P_{10}$ do not correspond to any imaging region.

In an example of (b) in FIG. 10, the pixel $P_2$ corresponds to the imaging region $B_1$, the pixel $P_4$ corresponds to the imaging region $B_2$, the pixel $P_6$ corresponds to the imaging region. $B_3$, and the pixel $P_8$ corresponds to the imaging region $B_4$. The pixels $P_1$, $P_3$, $P_5$, $P_7$, $P_9$, and $P_{10}$ do not correspond to any imaging region.

In an example of (c) in FIG. 10, the pixel $P_2$ corresponds to the imaging region $B_1$, the pixel $P_5$ corresponds to the imaging region $B_2$, and the pixel $P_8$ corresponds to the imaging region $B_3$. The pixels $P_1$, $P_3$, $P_4$, $P_6$, $P_7$, $P_9$, and $P_{10}$ do not correspond to any imaging region.

In an example of (d) in FIG. 10, the pixels $P_4$ and $P_5$ correspond to the imaging region $B_1$ and the pixels $P_8$ and $P_9$ correspond to the imaging region $B_2$. The pixels $P_1$ to $P_3$, $P_6$, $P_7$, and $P_{10}$ do not correspond to any imaging region.

Here, that the pixel and the imaging region correspond to each other means that a photoelectric conversion region of the pixel and the imaging region at least partially overlap each other.

In the examples of (b) to (d) in FIG. 10, pixels that do not correspond to any imaging region on the light receiving surface of the detection unit 32 exist adjacent to both sides of each imaging region. In the example of (b) in FIG. 10, one pixel that does not correspond to any imaging region exists between two adjacent imaging regions. In the examples of (c) and (d) in FIG. 10, two pixels that do not correspond to any imaging region exist between two adjacent imaging regions. In the example of (d) in FIG. 10, because two pixels correspond to each imaging region, a sum of detection signal values of the pixels $P_4$ and $P_5$ may be set to the intensity of the light arriving at the imaging region $P_1$ and a sum of detection signal values of the pixels $P_8$ and $P_9$ may be set to the intensity of the light arriving at the imaging region $B_2$.

In the present embodiment, the detection unit 32 has, on the light receiving surface, the plurality of imaging regions being in the imaging relation by the imaging optical system with the plurality of irradiation regions in the observation object S, each of the plurality of imaging regions corresponds to one or more pixels, and a pixel that corresponds to none of the plurality of imaging regions exists adjacent to at least one side of each imaging region. In the present embodiment, the interval between the plurality of irradiation regions in the observation object S or the imaging magnification of the imaging optical system is adjusted such that the above relation is satisfied.

FIG. 11 includes diagrams for explaining a relation between the detection signal output from the detection unit 32 and the image of the observation object S. In the example shown in (b) in FIG. 10, when the light receiving region on the light receiving surface of the detection unit 32 does not spread more than the imaging region, as shown in (a) in FIG. 11, the detection signal output from the detection unit 32 becomes a value according to a light receiving amount of each pixel for each of the pixels $P_2$, $P_4$, $P_6$, and $P_8$ corresponding to any imaging region and becomes a dark current noise level for each of the other pixels $P_1$, $P_3$, $P_5$, $P_7$, $P_9$, and $P_{10}$.

In general, because the detection signal output from the detection unit is a current signal, the current signal is converted into a voltage signal by a current-voltage conversion circuit. Thereafter, as shown in (b) in FIG. 11, a voltage signal value is stored at a position on the image corresponding to the position of each irradiation region in the observation object S, by the control unit 70 functioning as the image generation unit. Further, at this time, offset correction and the like are performed on the voltage signal as necessary.

In the case where there is an irradiation region near the surface of the observation object S and the light receiving region does not spread more than the imaging region on the light receiving surface of the detection unit 32, it may be as described above. In contrast, in the case where there is an irradiation region at a deep position in the observation object S and the light receiving region spreads more than the imaging region on the light receiving surface of the detection unit 32, to improve the SN ratio of the image of the observation object S to be generated, the control unit 70 functioning as the image generation unit corrects the detection signal of the pixel corresponding to each imaging region on the basis of detection signals of one or two or more pixels adjacent to the imaging region and not corresponding to any imaging region and generates the image of the observation object S on the basis of the corrected detection signal. Specifically, it is as follows.

A detection signal value of the pixel $P_n$ corresponding to the imaging region is set to $V_{signal\_n}$, and detection signal values of the pixels $P_{n-1}$ and $P_{n+1}$ adjacent to both sides of the imaging region are set to $V_{sample\_n-1}$ and $V_{sample\_n+1}$. The control unit 70 obtains a detection signal value $V_{output\_n}$ of the pixel $P_n$ corresponding to the imaging region after the correction, by the following Formula (1). Here, α is a coefficient, which is normally about 1.

[Formula 1]

$$V_{output\_n} = V_{signal\_n} - \frac{\alpha}{2}(V_{sample\_n-1} + V_{sample\_n+1}) \tag{1}$$

FIG. 12 includes graphs showing a result of simulation for confirming an effect of correction of the detection signal. This figure shows the case where the fluorescence is generated in one irradiation region among the four irradiation regions in the observation object when the four-point scanning is performed, and the imaging region on the light receiving surface of the detection unit 32 corresponding to the irradiation region in which the fluorescence has been generated corresponds to the pixel $P_6$ (anode number 6). (a) in FIG. 12 shows simulation conditions and shows the spread of the light receiving region on the light receiving surface of the detection unit 32 when a single irradiation region is set to a depth 500 μm of the observation object S shown in FIG. 7. (b) in FIG. 12 shows a detection signal of each of the pixels $P_2$, $P_4$, $P_6$, and $P_8$ corresponding to any imaging region for each of an example (the case where the correction according to Formula (1) is performed) and a comparative example (the case where the correction is not performed).

In (a) in FIG. 12 and the comparative example of (b) in FIG. 12, the light receiving region spreads more than the imaging region on the light receiving surface of the detection unit 32, so that the detection signal is output from the pixel $P_6$ corresponding to the imaging region, and in addition, the noise is output from the pixels $P_4$ and $P_8$ and the like corresponding to other imaging regions. By reducing noise of the pixels $P_4$ and $P_8$ and the like, the SN ratio of the image of the observation object S can be improved. If attention is paid to the respective detection signal values of the pixels $P_3$ to $P_9$ with the pixel $P_6$ as a center, it can be seen that the detection signal value of the pixel $P_6$ is largest and an output value of the pixel decreases as the distance from the pixel $P_6$ increases. Further, the output value of the pixel $P_4$ is substantially an average value of the respective output values of the pixels $P_3$ and $P_5$ adjacent to both sides. Therefore, n=4 may be set in Formula (1) and a detection signal value $V_{output\_4}$ of the pixel $P_4$ after the correction may be obtained. The same is applied to the pixels $P_2$, $P_6$, and $P_8$. A correction result is shown by the graph of the example of (b) in FIG.

12. As compared with the comparative example, the noise level of each of the pixels $P_4$ and $P_8$ is reduced to ½ or less by the correction in the example.

FIG. 13 includes also graphs showing a result of simulation for confirming an effect of correction of the detection signal. This figure shows the case where the fluorescence is generated in two irradiation regions among the four irradiation regions in the observation object when the four-point scanning is performed, one imaging region on the light receiving surface of the detection unit 32 corresponding to the irradiation region in which the fluorescence has been generated corresponds to the pixel $P_2$ (anode number 2), and the other imaging region corresponds the pixel $P_6$ (anode number 6). (a) in FIG. 12 shows simulation conditions and shows the spread of the light receiving region on the light receiving surface of the detection unit 32 when two irradiation regions are set to each of the surface (depth 0 μm) and a depth 500 μm of the observation object S shown in FIG. 7. (b) in FIG. 12 shows a detection signal of each of the pixels $P_2$, $P_4$, $P_6$, and $P_8$ corresponding to any imaging region for each of an example (the case where the correction according to Formula (1) is performed) and a comparative example (the case where the correction is not performed).

In (a) in FIG. 13 and the comparative example of (b) in FIG. 13, when two irradiation regions are set to the surface (depth 0 μm) of the observation object S, the light receiving region has almost the same spread as the spread of the imaging region on the light receiving surface of the detection unit 32, the detection signals are output from the pixels $P_2$ and $P_6$, and the noise is hardly output from other pixels $P_4$ and $P_8$. In contrast, when two irradiation regions are set to the depth 500 μm of the observation object S, the light receiving region spreads more than the imaging region on the light receiving surface of the detection unit 32, so that the detection signals are output from the pixels $P_2$ and $P_6$ and the noise is output from other pixels $P_4$ and $P_8$. In the same way as the above, by reducing the noise of the pixels $P_4$ and $P_8$ and the like, the SN ratio of the image of the observation object S can be improved. The same is applied to the pixels $P_2$ and $P_6$. A correction result is shown by the graph of the example of (b) in FIG. 13. Even in this case, as compared with the comparative example, the noise level of each of the pixels $P_4$ and $P_8$ is reduced to ½ or less by the correction in the example.

The correction is performed on not only the output values of the pixels $P_4$ and $P_8$ but also the output values of the pixels $P_2$ and $P_6$. The output values of the pixels $P_1$ and $P_3$ are affected by the output value of the pixel $P_2$, and therefore, if the above correction is performed on the output value of the pixel $P_2$, the output value of the pixel $P_2$ is excessively reduced. Similarly, the output values of the pixels $P_5$ and $P_7$ are affected by the output value of the pixel $P_6$, and therefore, if the above correction is performed on the output value of the pixel $P_6$, the output value of the pixel $P_6$ is excessively reduced. However, while the output values of the pixels $P_2$ and $P_6$ are originally large, reduction amounts by the correction are small. Therefore, even if the output values of the pixels $P_2$ and $P_6$ are slightly sacrificed to improve the SN ratio of the image of the observation object S, there is little problem.

Next, an effect of the present embodiment will be described in comparison with the conventional SN ratio improvement techniques described in Non Patent Documents 1 and 2. In the conventional SN ratio improvement techniques, pixels that do not correspond to any imaging region are not provided between the plurality of imaging regions on the light receiving surface of the detection unit.

In the SN ratio improvement technique described in Non Patent Document 1, a light receiving amount distribution (corresponding to (a) in FIG. 12) spreading on the light receiving surface of the detection unit is obtained by performing the single-point scanning on the observation object having a single fluorescence generation region, and deconvolution of the image of the observation object acquired by the multi-point scanning and the light receiving amount distribution is calculated. In this SN ratio improvement technique, it is necessary to obtain the light receiving amount distribution spreading on the light receiving surface of the detection unit by performing the single-point scanning separately from the multi-point scanning. Further, because the light receiving amount distribution differs by the depth (position in the z direction) of the fluorescence generation region in the observation object, it is necessary to set the irradiation region to each position in the z direction and obtain the distribution, and it takes a long time to acquire data.

In the SN ratio improvement technique described in Non Patent Document 2, estimation by a maximum likelihood estimation method is performed on the basis of the image of the observation object acquired by the multi-point scanning, and therefore, when the estimation by the maximum likelihood estimation method is performed, it is necessary to repeat the calculation, and it takes a long time to repeat the calculation.

These conventional SN ratio improvement techniques require a long time to acquire or calculate data and real-time processing is difficult. Although multi-point scanning aims to shorten the measurement time, these conventional SN ratio improvement techniques require a long time to acquire or calculate the data, and therefore, a time longer than that in the single-point scanning may be necessary.

In contrast, in the present embodiment, a signal necessary for correction can be acquired by the multi-point scanning, and the correction can be performed by simple calculation processing, so that a required time is almost the same as that in the case where the correction is not performed. As described above, in the present embodiment, the SN ratio of the image of the observation object generated by the multi-point scanning can be easily improved.

Next, examples where the SN ratio improvement technique according to the present embodiment is applied will be described.

FIG. 14 includes fluorescence images of an observation object showing an effect of SN ratio improvement according to a first example. In the first example, the four-point scanning is performed using a resultant obtained by dispersing fluorescent beads in an epoxy resin as the observation object. This figure shows a start position of scanning (raster scan) by an arrow in each partial region when a region to be observed in the observation object is equally divided into four partial regions. (a) in FIG. 14 is the same as (b) in FIG. 9 and is a fluorescence image before the correction. In the fluorescence image before the correction, the fluorescent beads are observed due to occurrence of the ghost in ranges surrounded by dashed line circles. (b) in FIG. 14 is a fluorescence image after the correction according to Formula (1). In the fluorescence image after the correction, a ghost image is not recognized. As compared with the fluorescence image before the correction ((a) in FIG. 14), it can be seen that the SN ratio is improved in the fluorescence image after the correction ((b) in FIG. 14). The correction based the simple calculation processing according to Formula (1) is only performed on the fluorescence image before the correction ((a) in FIG. 14), so that the fluorescence image ((b) in FIG. 14) where the SN ratio has been improved can be easily obtained in a short time.

Figure 15:
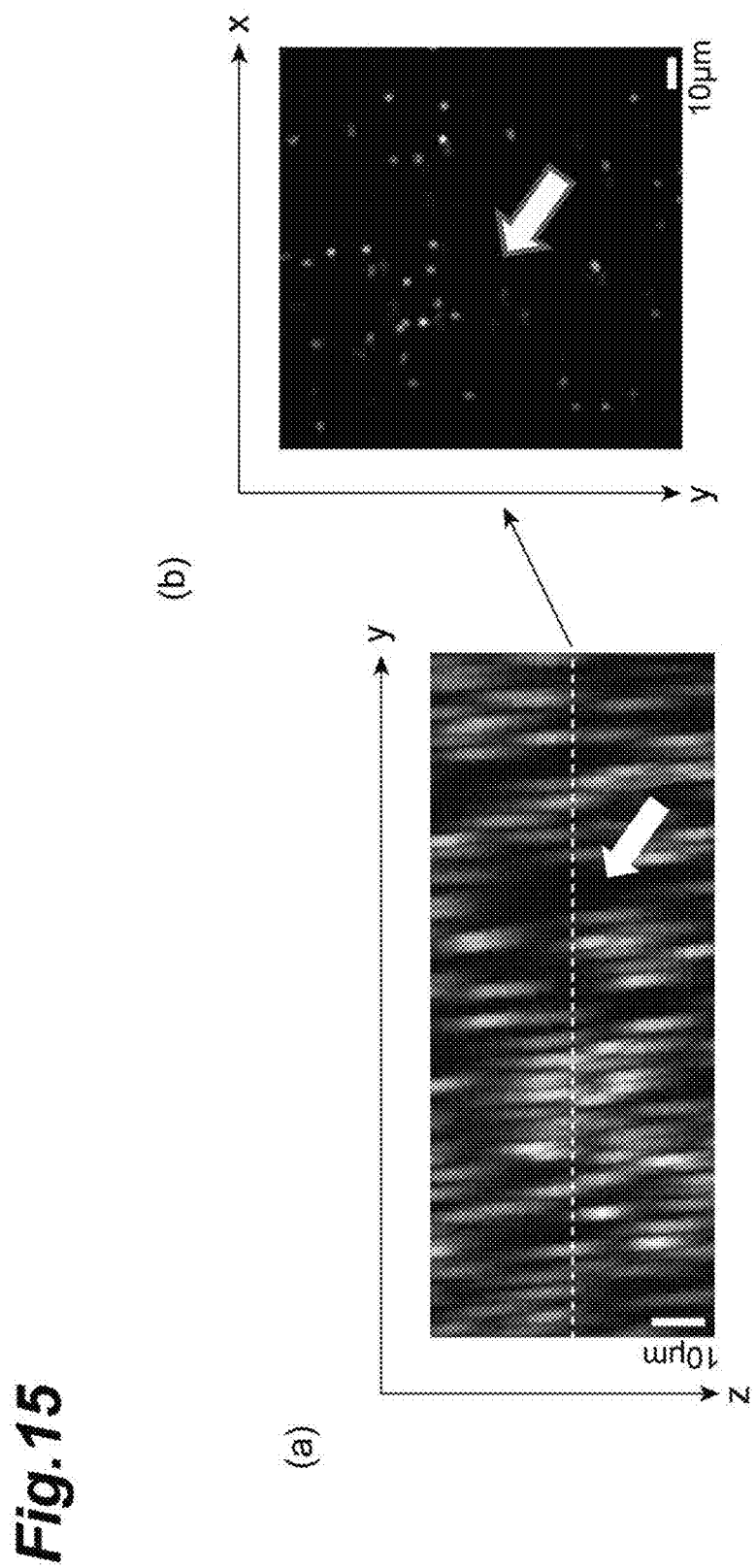
FIG. 15 includes (a), (b) fluorescence images of an observation object showing an effect of SN ratio improvement according to a second example.
Figure 16:
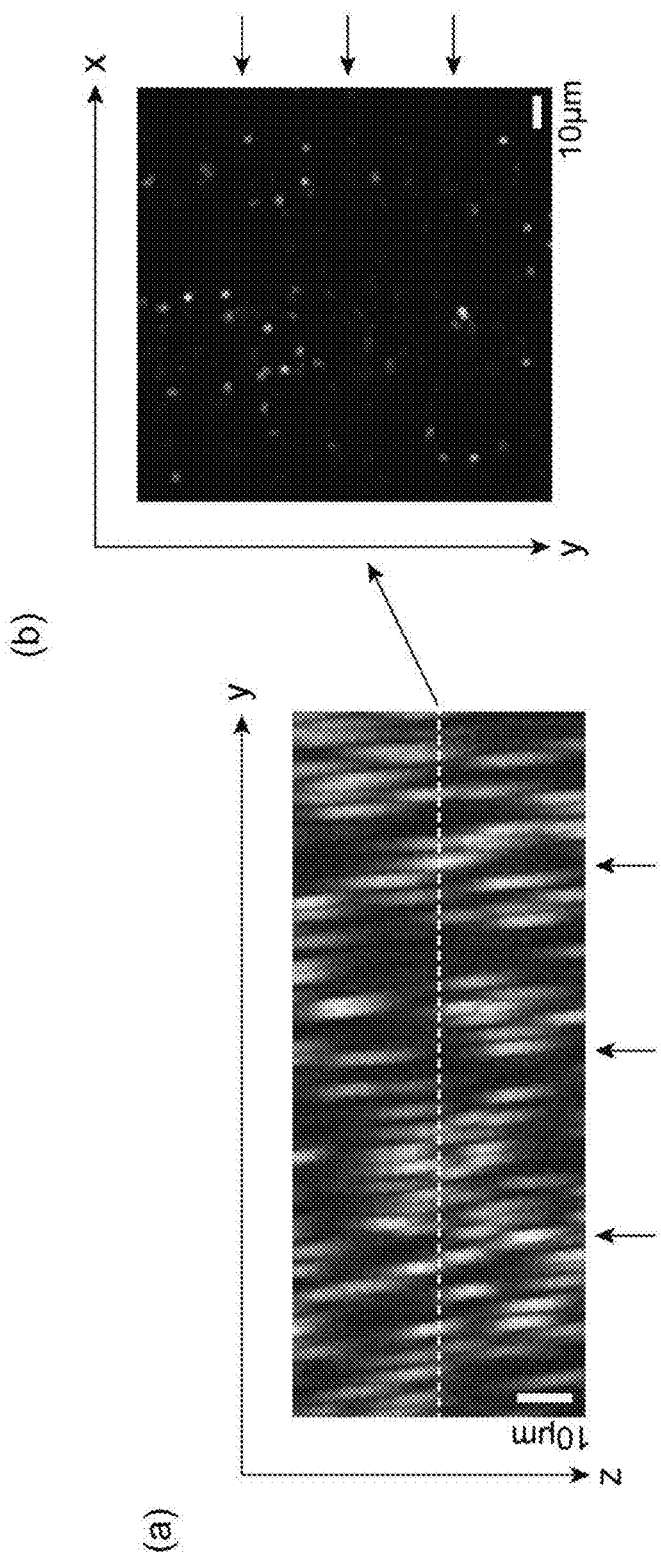
FIG. 16 includes (a), (b) fluorescence images of an observation object showing an effect of SN ratio improvement according to the second example.
Figure 17:
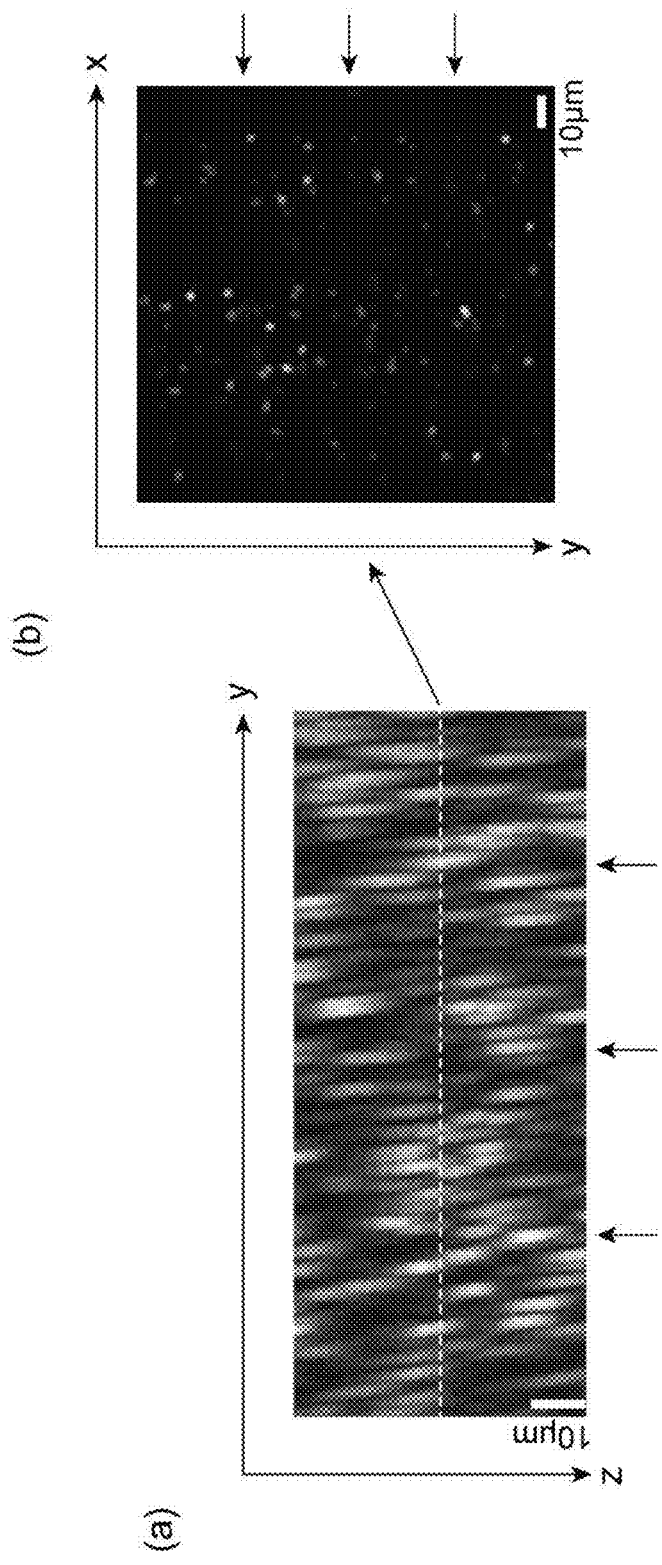
FIG. 17 includes (a), (b) fluorescence images of an observation object showing an effect of SN ratio improvement according to the second example.

FIG. 15 to FIG. 17 include fluorescence images of an observation object showing an effect of SN ratio improvement according to a second example. The observation object used in the second example has a higher dispersion density of the fluorescent beads in the epoxy resin than that used in the first example. By setting the surface of the observation object to z=0 and moving the objective lens at a pitch of 0.6 µm in a range of z=1000 µm to 1030 µm, a three-dimensional image is acquired. An actual moving amount in the depth direction of the observation object is obtained by multiplying an objective lens moving amount by a refractive index of the observation object. Further, aberration correction is performed at the time of light irradiation on the observation object.

(a) in FIG. 15 is a yz maximum value projection image in the case where the single-point scanning is performed, and (b) in FIG. 15 is an xy plane image at a depth shown by a dashed line in (a) in FIG. 15. (a) in FIG. 16 is a yz maximum value projection image in the case where the four-point scanning is performed and the correction according to Formula (1) is performed, and (b) in FIG. 16 is an xy plane image at a depth shown by a dashed line in (a) in FIG. 16. (a) in FIG. 17 is a yz maximum value projection image in the case where the four-point scanning is performed and the correction according to Formula (1) is not performed, and (b) in FIG. 17 is an xy plane image at a depth shown by a dashed line in (a) in FIG. 17. FIG. 16 and FIG. 17 show a start position of scanning (raster scan) by an arrow in each partial region when a region to be observed in the observation object is equally divided into four partial regions.

The arrows in FIG. 15 indicate notable points. If FIG. 15 to FIG. 17 are compared, it can be seen that the SN ratio in the example (FIG. 16) where the four-point scanning is performed and the correction according to Formula (1) is performed is improved as compared with the comparative example (FIG. 17) where the four-point scanning is performed and the correction according to Formula (1) is not performed and is almost the same as the SN ratio in the case (FIG. 15) where the single-point scanning is performed.

Figure 18:
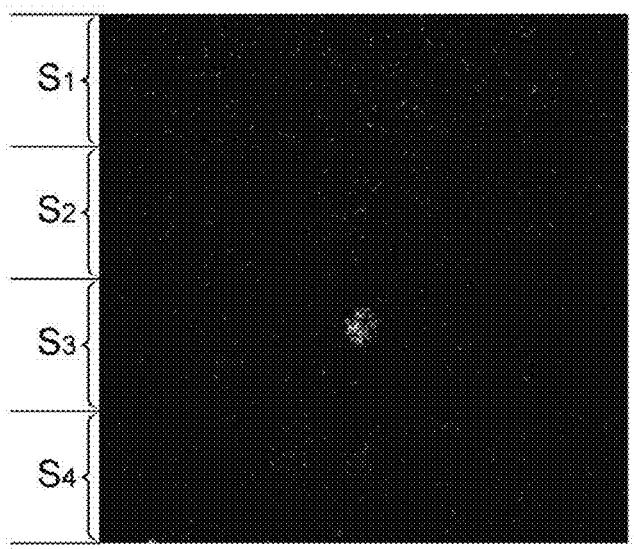
FIG. 18 is a fluorescence image of an observation object showing an effect of SN ratio improvement according to a third example.
Figure 19:
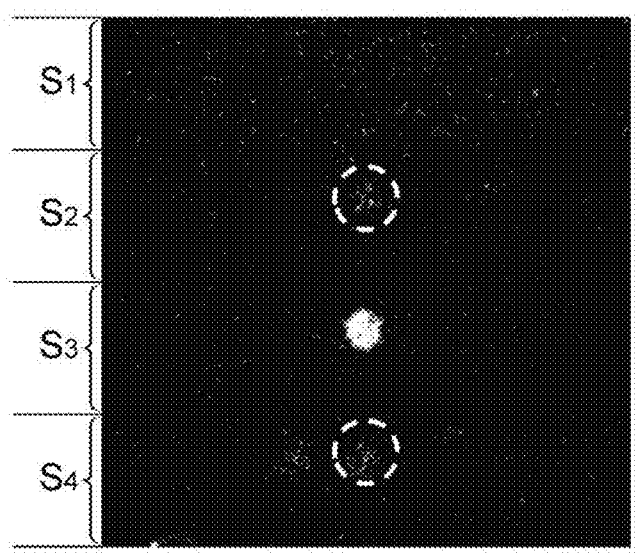
FIG. 19 is a fluorescence image of an observation object according to a comparative example compared with the third example.

FIG. 18 is a fluorescence image of an observation object showing an effect of SN ratio improvement according to a third example. In the third example, a brain of a rat with fluorescein isothiocyanate-dextran fixed in a blood vessel by perfusion fixation is used as an observation object, an irradiation region is set to a depth of about 100 µm, and the four-point scanning is performed. FIG. 18 is the fluorescence image in the case (example) where the correction according to Formula (1) is performed. FIG. 19 is a fluorescence image in the case (comparative example) where the correction according to Formula (1) is not performed. In the fluorescence image (example) of FIG. 18, a blood vessel image extending parallel to an optical axis in a depth direction from the near side is recognized in a partial region $S_3$ among partial regions $S_1$ to $S_4$ of the observation object S. In contrast, in the fluorescence image (comparative example) of FIG. 19, ghost images of the blood vessel image are recognized in the partial regions $S_2$ and $S_4$. In the fluorescence image (example) of FIG. 18, the ghost image is suppressed to the noise level.

Next, modifications will be described. For example, configurations of various modifications to be described below can be taken.

The correction formula is not limited to Formula (1). For example, the control unit 70 may obtain a detection signal value $V_{output\_n}$ after correction in the pixel $P_n$ corresponding to the imaging region on the light receiving surface of the detection unit 32, by the following Formula (2). When the detection signal value $V_{output\_n}$ after the correction is obtained from the detection signal value $V_{signal\_n}$ of the pixel $P_n$ corresponding to the imaging region, Formula (2) performs weighting in consideration of not only detection signal values $V_{sample\_n-1}$ and $V_{sample\_n+1}$ of pixels $P_{n-1}$ and $P_{n+1}$ adjacent to both sides of the imaging region but also detection signal values $V_{signal\_n-2}$ and $V_{signal\_n+2}$ of further adjacent pixels $P_{n-2}$ and $P_{n+2}$. Although there may be various other correction formulas, basically, the detection signal of the pixel corresponding to the imaging region may be corrected using the detection signal of the pixel not corresponding to any imaging region.

[Formula 2]

$$V_{output\_n} = V_{signal\_n} - \frac{\alpha}{2}\left(\frac{V_{signal\_n-2}}{V_{signal\_n} + V_{signal\_n-2}}V_{sample\_n-1} + \frac{V_{signal\_n+2}}{V_{signal\_n} + V_{signal\_n+2}}V_{sample\_n+1}\right) \quad (2)$$

Figure 20:
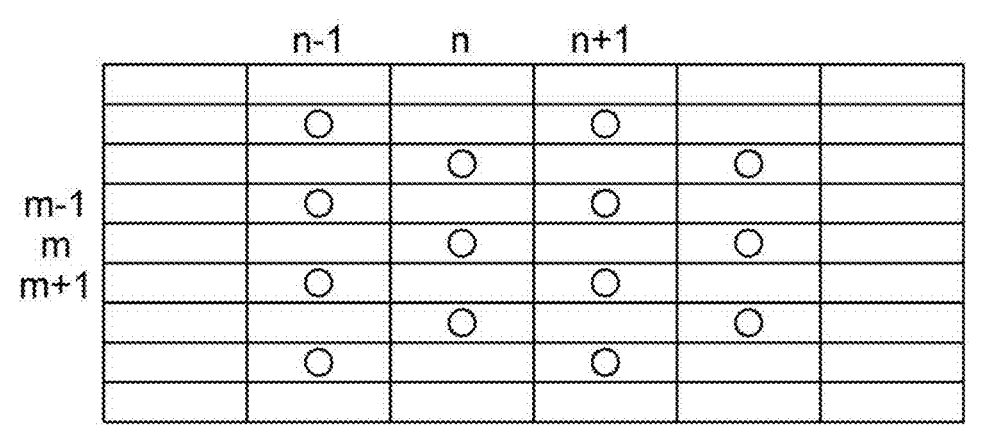
Figure 21:
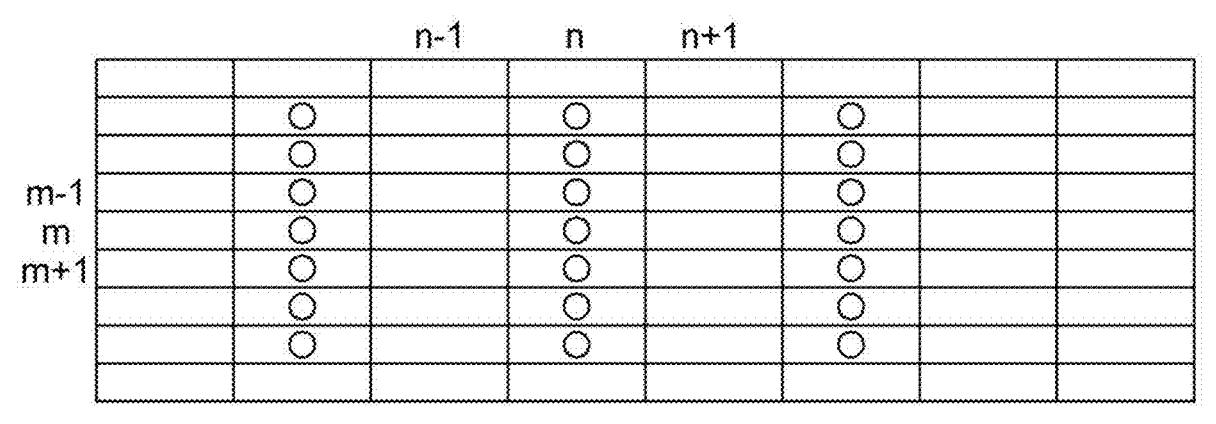
Figure 22:
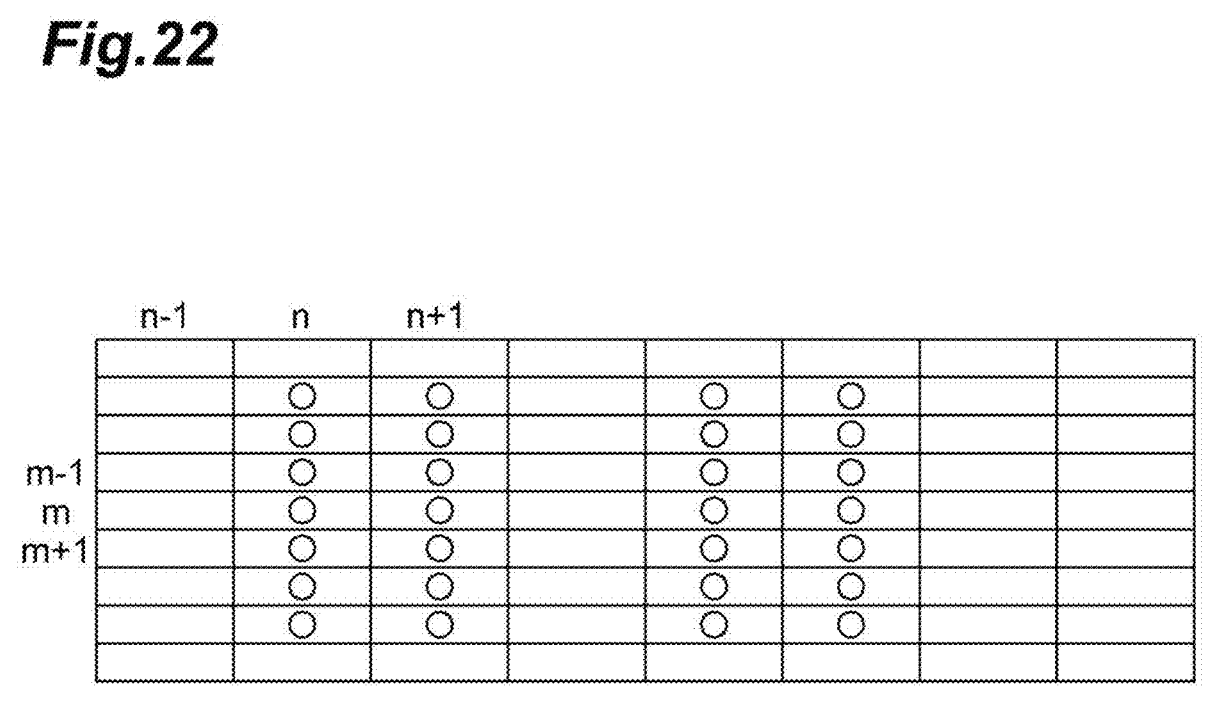

In the above embodiment, although the case where the detection unit in which the plurality of pixels are one-dimensionally arranged on the light receiving surface is used has been described, a detection unit in which the plurality of pixels are two-dimensionally arranged on the light receiving surface may be used. FIG. 20 to FIG. 22 are diagrams for explaining a relation between pixel structures and imaging regions in the case of using the detection unit in which the plurality of pixels are two-dimensionally arranged on the light receiving surface. In these figures, rectangular frames represent pixels and circular regions represent imaging regions.

In the example of FIG. 20, four pixels that do not correspond to any imaging region exist adjacent to four sides of each imaging region on the light receiving surface of the detection unit. In this case, a detection signal value $V_{output\_m,n}$ after the correction can be obtained from a detection signal value $V_{signal\_m,n}$ of a pixel $P_{m,n}$ corresponding to the imaging region, for example, by the following Formula (3). $V_{sample\_m-1,n}$, $V_{sample\_m+1,n}$, $V_{sample\_m,n-1}$, and $V_{sample\_m,n+1}$ are detection signals values of pixels $P_{m-1,n}$, $P_{m+1,n}$, $P_{m,n-1}$, and $P_{m,n+1}$ adjacent to the four sides of the imaging region, respectively.

[Formula 3]

$$V_{output\_m,n} = V_{signal\_m,n} - \frac{\alpha}{4}(V_{sample\_m-1,n} + V_{sample\_m+1,n} + V_{sample\_m,n-1} + V_{sample\_m,n+1}) \quad (3)$$

In the example of FIG. 21, two pixels that do not correspond to any imaging region exist adjacent to both sides of each imaging region on the light receiving surface of the detection unit. In this case, the detection signal value $V_{output\_m,n}$ after the correction can be obtained from the detection signal value $V_{signal\_m,n}$ of the pixel $P_{m,n}$ corresponding to the imaging region, for example, by the following Formula (4). $V_{signal\_m-1,n}$, $V_{signal\_m+1,n}$, $V_{sample\_m,n-1}$, and $V_{sample\_m,n+1}$ are the detection signals values of the pixels $P_{m-1,n}$, $P_{m+1,n}$, $P_{m,n-1}$, and $P_{m,n+1}$ adjacent to the four sides of the imaging region, respectively.

[Formula 4]

$$V_{output\_m,n} = V_{signal\_m,n} - \frac{\alpha}{4}(V_{signal\_m-1,n} + V_{signal\_m+1,n} + V_{signal\_m,n-1} + V_{signal\_m,n+1}) \quad (4)$$

In the example of FIG. 22, one pixel that does not correspond to any imaging region exists adjacent to one side of each imaging region on the light receiving surface of the detection unit. In this case, the detection signal value $V_{output\_m,n}$ after the correction can be obtained from the detection signal value $V_{signal\_m,n}$ of the pixel $P_{m,n}$ corresponding to the imaging region, for example, by the following Formula (5). $V_{signal\_m-1,n}$, $V_{signal\_m+1,n}$, $V_{sample\_m,n-1}$, and $V_{signal\_m,n+1}$ are the detection signals values of the pixels $P_{m-1,n}$, $P_{m+1,n}$, $P_{m,n-1}$, and $P_{m,n+1}$ adjacent to the four sides of the imaging region, respectively.

[Formula 5]

$$V_{output\_m,n} = V_{signal\_m,n} - \frac{\alpha}{4}(V_{signal\_m-1,n} + V_{signal\_m+1,n} + V_{sample\_m,n-1} + V_{signal\_m,n+1}) \quad (5)$$

Here, in the examples of FIG. 21 and FIG. 22, the extent of SN ratio improvement by the correction is small, however, when the SN ratio of the image before the correction is very low, the effect of the SN ratio improvement by the correction is sufficiently recognized.

A coefficient $\alpha$ in each of the Formulas (1) to (5) may be normally about 1, however, the coefficient can be set on the basis of the detection signal value of each pixel of the detection unit. For example, because the detection signal value of a pixel that does not correspond to any imaging region on the light receiving surface of the detection unit should originally be 0, a value of the coefficient $\alpha$ may be set such that a result of the correction on the detection signal value of the pixel becomes 0.

In the above embodiment, the case where the fluorescence image of the observation object is generated has been mainly described, however, the embodiment is also applicable to the case where an image of harmonic light or reflected scattered light of the observation object is generated. When the fluorescence image is generated, the single photon excitation may be performed or the multiphoton excitation may be performed. Further, an image of autofluorescence may be generated.

In the above embodiment, the case where light irradiation is performed on the plurality of irradiation regions in the observation object by using the spatial light modulator has been mainly described, however, light irradiation may be performed on the plurality of irradiation regions in the observation object using a segment type deformable mirror, a diffraction optical element, a microlens array, a beam splitter, or the like. Further, the plurality of irradiation regions in the observation object may have different depths.

In the above embodiment, the case where mPMT is used as the detection unit has been mainly described, however, MPPC (registered trademark), a photodiode array, an avalanche photodiode array, a CCD image sensor, a CMOS image sensor, or the like can be used as the detection unit.

The imaging magnification of the imaging optical system for guiding the light generated in the irradiation region of the observation object and forming an image on the imaging region on the light receiving surface of the detection unit is preferably variable. For example, the imaging lens 31 or the zoom lens 47 provided at the front stage of the detection unit 32 in the configuration of the image acquisition apparatus 1 shown in FIG. 1, and the imaging lens 31 provided at the front stage of the detection unit 32 in the configuration of the image acquisition apparatus 2 shown in FIG. 2 are preferably variable focal lenses. The zoom magnification is preferably controlled by an electric signal provided from the control unit. The variable focal lens may be a single element controlled by an electric signal or may have a configuration in which one or more lenses of a fixed focal length made of a glass material such as BK7 are combined.

In the image acquisition apparatuses 1 and 2, the view field range and the resolution are substantially determined according to the scan range of the scanning unit (optical scanners 14, 14a, and 14b), the interval and number of imaging regions on the light receiving surface of the detection unit 32, and the size of the irradiation region in the observation object. For example, when it is desired to observe a wide view field range, the scan range is widely set and the scanning is performed. Conversely, when it is desired to observe a narrow view field range, the scan range is narrowly set and the scanning is performed.

In the case of performing the multi-point scanning, the interval between the plurality of irradiation regions in the observation object can be changed by the modulation pattern presented in the spatial light modulator, and the view field range can be changed. Meanwhile, the interval between the plurality of pixels arrayed on the light receiving surface of the detection unit is fixed. Therefore, if the interval between the plurality of irradiation regions in the observation object is changed, the correspondence relation between the imaging region and the pixel on the light receiving surface of the detection unit may be different.

Figure 23:
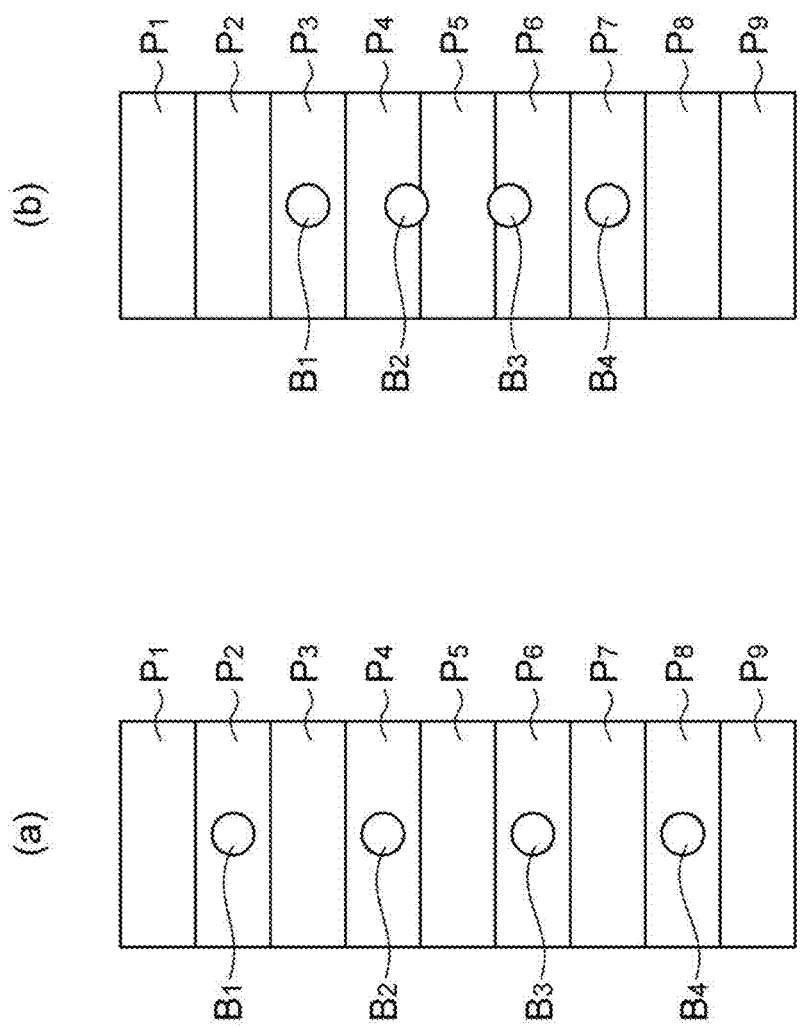
FIG. 23 includes (a), (b) diagrams for explaining a relation between pixel structures and imaging regions on a light receiving surface of a detection unit.

For example, when the plurality of irradiation regions in the observation object are arranged at a constant interval, as shown in (a) in FIG. 23, a pixel that does not correspond to any imaging region exists between the two adjacent imaging regions. However, if the plurality of irradiation regions in the observation object are arranged at different intervals, as shown in (b) in FIG. 23, a situation where a pixel that does not correspond to any imaging region does not exist between the two adjacent imaging regions may occur. To avoid the occurrence of the above situation, even when the interval between the plurality of irradiation regions in the observation object is changed, it is possible to satisfy a preferable relation between the pixel structure and the imaging regions shown in (a) in FIG. 23, by adjusting the variable focal lens disposed at the front stage of the detection unit 32.

When the light is diffracted using the spatial light modulator and the plurality of irradiation regions are formed, a diffraction grating or a modulation pattern (hologram pattern) for generating a plurality of irradiation regions is presented in the spatial light modulator. A maximum diffraction angle θmax of the hologram pattern is obtained from a grating interval a of a diffraction grating pattern (binary 2 pixel period) having the highest spatial frequency capable of being expressed by the spatial light modulator and a wavelength λ of the light to be modulated, by the following formula.

[Formula 6]

$$\theta_{max} \approx \lambda/a \quad (6)$$

Further, an interval L between +1st-order diffracted light and 0th-order diffracted light (focusing position when the diffraction grating is not displayed) in the observation object is obtained by the following formula, using a focal length fobj and θmax of the objective lens. Therefore, the spatial light modulator can form the irradiation region in a range separated by 2L×2L around an optical axis in the observation object.

[Formula 7]

$$L = f_{obj} \tan \theta_{max} \quad (7)$$

Here, when a wavelength of light is set to 800 nm, a grating interval a is set to 40 μm, and a focal length fobj of the objective lens is set to 4.5 mm, L=90 μm is obtained.

To form a plurality of irradiation regions in the observation object, a hologram pattern for that purpose is presented in the spatial light modulator. Here, it is assumed that four irradiation regions arranged at a constant interval are formed in the observation object and are scanned, and the interval is set to three cases to be described below.

(a) 5 μm, (b) 10 μm, (c) 15 μm

When the irradiation regions are scanned in the observation object, a scannable range is, for example, as follows.

(a) 20×20 μm, (b) 40×40 μm, (c) 60×60 μm

At this time, a diffraction angle θ formed by two adjacent irradiation ranges is as follows.

(a) 0.0011. [rad], (b) 0.0022[rad], (c) 0.0033 [rad]

A focal length f1 of the variable focal lens provided at the front stage of the detection unit is set to 200 mm. An interval L1 between two adjacent imaging regions on the light receiving surface of the detection unit is represented as follows by the following Formula (8) from the diffraction angle θ and the focal length f1.

(a) 222 μm, (b) 444 μm, (c) 666 μm

[Formula 8]

$$L1 = f_1 \tan \theta \quad (8)$$

The interval between the plurality of pixels arranged on the light receiving surface of the detection unit is set to 400 μm. At this time, under the condition of (a), there is a possibility that a plurality of imaging regions may correspond to one pixel, and under the condition of (c), pixels where fluorescence does not enter are generated.

To solve such a problem, the variable focal lens is adopted. Further, an electrically controlled zoom lens is used to increase or decrease an interval between the two adjacent imaging regions on the light receiving surface of the detection unit as follows.

(a) 3.6 times, (b) 1.8 times, (c) 1.2 times

In this way, the interval between the two adjacent imaging regions can be set to 800 μm, and a pixel that does not correspond to any imaging region exists between the two adjacent imaging regions.

As described above, if the interval p between the plurality of pixels of the detection unit, the diffraction angle θ formed by the two adjacent irradiation regions among the plurality of irradiation regions formed by the spatial light modulator, and the focal length f1 of the lens disposed immediately before the detection unit are known, the magnification M where the variable focal lens is to be enlarged or reduced can be determined by the following formula, and automatic adjustment is performed on the basis of this.

[Formula 9]

$$M = p/(f_1 \tan \theta) \quad (9)$$

M may be different from a theoretical value in actual experiments. Calibration is first performed to measure a deviation amount between the theoretical value and the actually measured value and the actually measured value is also stored. When the interval of the irradiation regions formed changes thereafter, the magnification is automatically changed in consideration of the deviation between the theoretical value of the zoom lens and the actually measured value. For example, when the interval of the irradiation regions changes to ½ in the theoretical value, the magnification may be changed to become ½ from the actually measured value.

Figure 24:
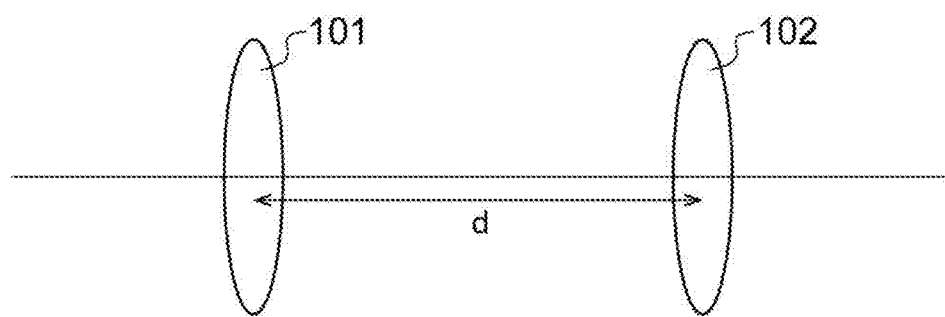
FIG. 24 is a diagram showing a configuration example of a variable focal lens.

When the variable focal lens is configured by combining a plurality of lenses, the variable focal lens can be configured by a fixed lens 101 and a variable lens 102 as shown in FIG. 24. In this case, a composite focal length f1 of the variable focal lens is represented by the following formula from a focal length fsta of the fixed lens 101, a focal length fele of the variable lens 102, and an interval d between both lenses. After obtaining the necessary composite focal length f1 by the above method, the focal length fele of the variable lens 102 may be obtained from the following formula.

[Formula 10]

$$\frac{1}{f_1} = \frac{1}{f_{sta}} + \frac{1}{f_{ele}} - \frac{d}{f_{sta} \cdot f_{ele}} \quad (10)$$

In any case, it is possible to automatically determine the focal length of the variable focal lens according to the interval of the plurality of irradiation regions generated by the spatial light modulator.

Here, when the imaging magnifications of the telecentric relay lens systems of the excitation light and the fluorescence are different from each other, it is also necessary to consider the imaging magnifications thereof. For example, it is necessary to consider these particularly when the optical system of the excitation light is configured to include three relay lens systems, whereas the optical system of the florescence is configured to include two relay lens systems. Further, when chromatic aberration (a phenomenon in which the focal length of the lens changes depending on the wavelength) exists in the lens, the correction thereof is necessary, so that it is preferable to include feedback, and the like for adjustment.

Further, it is preferable to adopt a configuration where the focusing position does not change even if the magnification of the variable lens changes. It is preferable to adopt a configuration where the detector is moved when the focusing position changes.

The image acquisition apparatus and the image acquisition method according to the present invention are not limited to the embodiments and the configuration examples described above and various modifications can be made.

The image acquisition apparatus according to the above embodiment is configured to include (1) a light source for outputting light; (2) an irradiation optical system for performing focused irradiation on a plurality of irradiation regions on a surface or inside of an observation object with the light output from the light source; (3) a scanning unit for scanning the plurality of irradiation regions in a direction intersecting with an optical axis of a direction of light irradiation on the observation object by the irradiation optical system; (4) an imaging optical system for guiding and imaging light generated in each of the plurality of irradiation regions caused by light irradiation on the observation object by the irradiation optical system; (5) a detection unit having a light receiving surface on which the plurality of irradiation regions are imaged by the imaging optical system, a plurality of pixels being arranged one-dimensionally or two-dimensionally on the light receiving surface, and for outputting a detection signal having a value according to a light receiving amount in each of the plurality of pixels; and (6) an image generation unit for generating an image of the observation object on the basis of the detection signal output from the detection unit.

Further, in the image acquisition apparatus of the above configuration, (a) the detection unit has a plurality of imaging regions being in an imaging relation by the imaging optical system with the plurality of irradiation regions in the observation object on the light receiving surface, each of the plurality of imaging regions corresponds to one or two or more pixels, and a pixel that corresponds to none of the plurality of imaging regions exists adjacent to each imaging region, and (b) the image generation unit corrects a detection signal of a pixel corresponding to each of the plurality of imaging regions on the basis of detection signals of one or two or more pixels that exist adjacent to each imaging region and correspond to none of the plurality of imaging regions, and generates an image of the observation object on the basis of the corrected detection signal.

In the above image acquisition apparatus, pixels that correspond to none of the plurality of imaging regions may exist adjacent to both sides of each imaging region on the light receiving surface of the detection unit, and the image generation unit may correct a detection signal of a pixel corresponding to each of the plurality of imaging regions on the basis of detection signals of two pixels that exist adjacent to the both sides of each imaging region and correspond to none of the plurality of imaging regions, and may generate an image of the observation object on the basis of the corrected detection signal.

In the above image acquisition apparatus, the plurality of imaging regions may be two-dimensionally arranged and four pixels that correspond to none of the plurality of imaging regions may exist adjacent to four sides of each imaging region on the light receiving surface of the detection unit, and the image generation unit may correct a detection signal of a pixel corresponding to each of the plurality of imaging regions on the basis of detection signals of the four pixels that exist adjacent to the four sides of each imaging region and correspond to none of the plurality of imaging regions, and may generate an image of the observation object on the basis of the corrected detection signal.

In the above image acquisition apparatus, two or more pixels that correspond to none of the plurality of imaging regions may exist between two adjacent imaging regions among the plurality of imaging regions on the light receiving surface of the detection unit.

In the above image acquisition apparatus, the irradiation optical system may include a spatial light modulator for spatially modulating the light output from the light source, and may perform focused irradiation on the plurality of irradiation regions with the modulated light by presenting a modulation pattern in the spatial light modulator. Further, in the above image acquisition apparatus, the irradiation optical system may include a diffraction optical element for diffracting the light output from the light source, and may perform focused irradiation on the plurality of irradiation regions with the light diffracted by the diffraction optical element.

In the above image acquisition apparatus, the scanning unit may include an optical scanner provided on an optical path of the irradiation optical system, and may drive the optical scanner to scan the plurality of irradiation regions. Further, in the above image acquisition apparatus, the scanning unit may scan the plurality of irradiation regions also in a direction of light irradiation on the observation object by the irradiation optical system.

In the above image acquisition apparatus, an imaging magnification of the imaging optical system may be variable.

In the above image acquisition apparatus, the detection unit may include a multi-anode photomultiplier tube having a plurality of anodes as the plurality of pixels. Further, in the above image acquisition apparatus, the detection unit may include an array of a plurality of avalanche photodiodes as the plurality of pixels.

The image acquisition method according to the above embodiment is an image acquisition method using the light source, the irradiation optical system, the scanning unit, the imaging optical system, and the detection unit, and for generating an image of the observation object on the basis of the detection signal output from the detection unit, and in the method, (a) a plurality of imaging regions in an imaging relation by the imaging optical system with the plurality of irradiation regions in the observation object are provided on the light receiving surface of the detection unit, each of the plurality of imaging regions corresponds to one or two or more pixels, and a pixel that corresponds to none of the plurality of imaging regions exists adjacent to each imaging region, and (b) a detection signal of a pixel corresponding to each of the plurality of imaging regions is corrected on the basis of detection signals of one or two or more pixels that exist adjacent to each imaging region and correspond to none of the plurality of imaging regions, and an image of the observation object is generated on the basis of the corrected detection signal.

Further, the image acquisition method may have the same configuration as each configuration of the image acquisition apparatus described above in the above configuration.

INDUSTRIAL APPLICABILITY

The present invention can be used as an image acquisition apparatus and an image acquisition method capable of easily improving an SN ratio of an image of an observation object generated by multi-point scanning.

REFERENCE SIGNS LIST 1, 2—image acquisition apparatus, 10—light source, 11, 12—spatial light modulator, 13—dichroic mirror, 14, 14a, 14b—optical scanner, 21—objective lens, 22—objective lens moving mechanism, 23—stage, 24—stage moving mechanism, 31—imaging lens, 32—detection unit, 41-46—lens, 47—zoom lens, 51-53—mirror, 54—filter, 61-66—lens, 70—control unit, 71—input unit, 72—display unit, S—observation object.

The invention claimed is:
1. An image acquisition apparatus comprising:
a light source configured to output light;
an irradiation optical system configured to perform focused irradiation on a plurality of irradiation regions on a surface or inside of an observation object with the light output from the light source;
a scanning unit configured to scan the plurality of irradiation regions in a direction intersecting with an optical axis of a direction of light irradiation on the observation object by the irradiation optical system;

an imaging optical system configured to guide and image light generated in each of the plurality of irradiation regions by light irradiation on the observation object by the irradiation optical system;

a detection unit having a light receiving surface on which the plurality of irradiation regions are imaged by the imaging optical system, a plurality of pixels being arranged one-dimensionally or two-dimensionally on the light receiving surface, and configured to output a detection signal having a value according to a light receiving amount in each of the plurality of pixels; and an image generation unit configured to generate an image of the observation object on the basis of the detection signal output from the detection unit, wherein the detection unit has a plurality of imaging regions in an imaging relation by the imaging optical system with the plurality of irradiation regions in the observation object on the light receiving surface, each of the plurality of imaging regions corresponds to one or two or more pixels, a pixel that corresponds to none of the plurality of imaging regions exists adjacent to each imaging region, and the image generation unit is configured to correct a detection signal of a pixel corresponding to each of the plurality of imaging regions on the basis of detection signals of one or two or more pixels that exist adjacent to each imaging region and correspond to none of the plurality of imaging regions, and generate an image of the observation object on the basis of the corrected detection signal.

2. The image acquisition apparatus according to claim 1, wherein pixels that correspond to none of the plurality of imaging regions exist adjacent to both sides of each imaging region on the light receiving surface of the detection unit, and the image generation unit is configured to correct a detection signal of a pixel corresponding to each of the plurality of imaging regions on the basis of detection signals of two pixels that exist adjacent to the both sides of each imaging region and correspond to none of the plurality of imaging regions, and generate an image of the observation object on the basis of the corrected detection signal.

3. The image acquisition apparatus according to claim 1, wherein the plurality of imaging regions are two-dimensionally arranged and four pixels that correspond to none of the plurality of imaging regions exist adjacent to four sides of each imaging region on the light receiving surface of the detection unit, and the image generation unit is configured to correct a detection signal of a pixel corresponding to each of the plurality of imaging regions on the basis of detection signals of the four pixels that exist adjacent to the four sides of each imaging region and correspond to none of the plurality of imaging regions, and generate an image of the observation object on the basis of the corrected detection signal.

4. The image acquisition apparatus according to claim 1, wherein two or more pixels that correspond to none of the plurality of imaging regions exist between two adjacent imaging regions among the plurality of imaging regions on the light receiving surface of the detection unit.

5. The image acquisition apparatus according to claim 1, wherein the irradiation optical system includes a spatial light modulator configured to spatially modulate the light output from the light source and is configured to perform focused irradiation on the plurality of irradiation regions with the modulated light by presenting a modulation pattern in the spatial light modulator.

6. The image acquisition apparatus according to claim 1, wherein the irradiation optical system includes a diffraction optical element configured to diffract the light output from the light source and is configured to perform focused irradiation on the plurality of irradiation regions with the light diffracted by the diffraction optical element.

7. The image acquisition apparatus according to claim 1, wherein the scanning unit includes an optical scanner provided on an optical path of the irradiation optical system and is configured to drive the optical scanner to scan the plurality of irradiation regions.

8. The image acquisition apparatus according to claim 1, wherein the scanning unit is configured to scan the plurality of irradiation regions also in a direction of light irradiation on the observation object by the irradiation optical system.

9. The image acquisition apparatus according to claim 1, wherein an imaging magnification of the imaging optical system is variable.

10. The image acquisition apparatus according to claim 1, wherein the detection unit includes a multi-anode photomultiplier tube having a plurality of anodes as the plurality of pixels.

11. The image acquisition apparatus according to claim 1, wherein the detection unit includes an array of a plurality of avalanche photodiodes as the plurality of pixels.

12. An image acquisition method using:
a light source configured to output light;
an irradiation optical system configured to perform focused irradiation on a plurality of irradiation regions on a surface or inside of an observation object with the light output from the light source;
a scanning unit configured to scan the plurality of irradiation regions in a direction intersecting with an optical axis of a direction of light irradiation on the observation object by the irradiation optical system;
an imaging optical system configured to guide and image light generated in each of the plurality of irradiation regions by light irradiation on the observation object by the irradiation optical system; and
a detection unit having a light receiving surface on which the plurality of irradiation regions are imaged by the imaging optical system, a plurality of pixels being arranged one-dimensionally or two-dimensionally on the light receiving surface, and configured to output a detection signal having a value according to a light receiving amount in each of the plurality of pixels,
the method for generating an image of the observation object on the basis of the detection signal output from the detection unit, wherein
a plurality of imaging regions in an imaging relation by the imaging optical system with the plurality of irradiation regions in the observation object are provided on the light receiving surface of the detection unit, each of the plurality of imaging regions corresponds to one or two or more pixels, a pixel that corresponds to none of the plurality of imaging regions exists adjacent to each imaging region, and
a detection signal of a pixel corresponding to each of the plurality of imaging regions is corrected on the basis of detection signals of one or two or more pixels that exist adjacent to each imaging region and correspond to none of the plurality of imaging regions, and an image of the observation object is generated on the basis of the corrected detection signal.

13. The image acquisition method according to claim 12, wherein pixels that correspond to none of the plurality of imaging regions exist adjacent to both sides of each imaging region on the light receiving surface of the detection unit, and
 a detection signal of a pixel corresponding to each of the plurality of imaging regions is corrected on the basis of detection signals of two pixels that exist adjacent to the both sides of each imaging region and correspond to none of the plurality of imaging regions, and an image of the observation object is generated on the basis of the corrected detection signal.

14. The image acquisition method according to claim 12, wherein the plurality of imaging regions are two-dimensionally arranged and four pixels that correspond to none of the plurality of imaging regions exist adjacent to four sides of each imaging region on the light receiving surface of the detection unit, and
 a detection signal of a pixel corresponding to each of the plurality of imaging regions is corrected on the basis of detection signals of the four pixels that exist adjacent to the four sides of each imaging region and correspond to none of the plurality of imaging regions, and an image of the observation object is generated on the basis of the corrected detection signal.

15. The image acquisition method according to claim 12, wherein two or more pixels that correspond to none of the plurality of imaging regions exist between two adjacent imaging regions among the plurality of imaging regions on the light receiving surface of the detection unit.

16. The image acquisition method according to claim 12, wherein the irradiation optical system includes a spatial light modulator configured to spatially modulate the light output from the light source and is configured to perform focused irradiation on the plurality of irradiation regions with the modulated light by presenting a modulation pattern in the spatial light modulator.

17. The image acquisition method according to claim 12, wherein the irradiation optical system includes a diffraction optical element configured to diffract the light output from the light source and is configured to perform focused irradiation on the plurality of irradiation regions with the light diffracted by the diffraction optical element.

18. The image acquisition method according to claim 12, wherein the scanning unit includes an optical scanner provided on an optical path of the irradiation optical system and is configured to drive the optical scanner to scan the plurality of irradiation regions.

19. The image acquisition method according to claim 12, wherein the plurality of irradiation regions are scanned by the scanning unit also in a direction of light irradiation on the observation object by the irradiation optical system.

20. The image acquisition method according to claim 12, wherein an imaging magnification of the imaging optical system is variable.

21. The image acquisition method according to claim 12, wherein the detection unit includes a multi-anode photomultiplier tube having a plurality of anodes as the plurality of pixels.

22. The image acquisition method according to claim 12, wherein the detection unit includes an array of a plurality of avalanche photodiodes as the plurality of pixels.

* * * * *